(12) United States Patent
Kim et al.

(10) Patent No.: US 7,298,976 B2
(45) Date of Patent: Nov. 20, 2007

(54) BI-DIRECTIONAL OPTICAL CROSS-CONNECT DEVICE

(75) Inventors: Jong-Kwon Kim, Taejonkwangyok-shi (KR); Ki-Cheol Lee, Suwon-shi (KR); Jun-Ho Koh, Suwon-shi (KR)

(73) Assignee: Samsung Electronics Co., Ltd., Maetan-Dong, Yeongtong-Gu, Suwon-si, Gyeonggi-Do (KR)

( * ) Notice: Subject to any disclaimer, the term of this patent is extended or adjusted under 35 U.S.C. 154(b) by 609 days.

(21) Appl. No.: 10/712,962

(22) Filed: Nov. 13, 2003

(65) Prior Publication Data
US 2004/0218927 A1    Nov. 4, 2004

(30) Foreign Application Priority Data
May 2, 2003    (KR) ............... 10-2003-0028233

(51) Int. Cl.
H04J 14/02    (2006.01)
(52) U.S. Cl. ............................ 398/84; 398/50
(58) Field of Classification Search .............. 398/50, 398/56, 82, 83, 84, 85, 86, 87, 88
See application file for complete search history.

(56) References Cited
U.S. PATENT DOCUMENTS
5,647,035 A  *  7/1997 Cadeddu et al. ............... 385/24
6,067,389 A     5/2000 Fatehi et al. ................... 385/17

* cited by examiner

Primary Examiner—Christina Leung
(74) Attorney, Agent, or Firm—Cha & Reiter, LLC

(57) ABSTRACT

Disclosed is an optical cross-connect device for communication between first and second optical networks communicating with each other using forward and backward optical signals each including of a plurality of channels. The device includes a first circulating part having first through fourth ports configured to output an optical signal, which is input to a higher-order port thereof, from a lower-order port thereof arranged adjacent to the higher-order port. The first circulating part is connected at the first and third ports thereof to a first optical network. A second circulating part has first through fourth ports configured to output an optical signal, which is input to a higher-order port thereof, from a lower-order port thereof arranged adjacent to the higher-order port. A first reflecting part is connected to respective second ports of the first and second circulating parts, and adapted to selectively reflect each channel of a forward optical signal which is input thereto or allow the channel to pass therethrough, and a second reflecting part is connected to respective fourth ports of the first and second circulating parts, and adapted to selectively reflect each channel of a backward optical signal which is input thereto or allow the channel to pass therethrough.

12 Claims, 17 Drawing Sheets

BI-DIRECTIONAL OPTICAL CROSS-CONNECT DEVICE

CLAIM OF PRIORITY

This application claims priority to an application entitled "BI-DIRECTIONAL OPTICAL CROSS-CONNECT DEVICE" filed in the Korean Intellectual Property Office on May 2, 2003 and assigned Serial No. 2003-28233, the contents of which are hereby incorporated by reference.

BACKGROUND OF THE INVENTION

1. Field of the Invention

The present invention relates to a wavelength division multiplexing (WDM) optical network. More particularly, the present invention relates to an optical cross-connect (OXC) device for connecting optical networks.

2. Description of the Related Art

Recently, practical use has been achieved of a wavelength division multiplexing (WDM) technique adapted to transmit optical signals of different wavelengths through a single-core optical fiber. In additional, it is also now possible to transmit a larger quantity of data at high speed than previously known. Furthermore, the optical settings or switching travel paths of optical signals has been made possible in accordance with development of certain optical element techniques. As a result, the actual construction of an optical network based on the WDM technique is now possible. For such a WDM optical network, a bi-directional OXC device is used that includes a main unit comprising a pair of wavelength division multiplexers/demultiplexers and an optical switch, in which is similar to a general uni-directional OXC device, and an accessory unit used for separately processing forward and backward optical signals.

For each wavelength division multiplexer/demultiplexer there is an arrayed-waveguide grating (AWG) used to achieve an easy optical signal channel extension and a simple control, yet having a high degree of integration. For the optical switch, a 2×2 space switch is mainly used. In addition, for each accessory unit adapted to process bi-directional optical signals, there are 3-port elements such as circulators, WDM filters, or wavelength interleavers.

FIG. 1 is a block diagram illustrating the configuration of a conventional WDM optical network. As shown in FIG. 1, the WDM optical network includes first and second WDM ring networks 110 and 120 each having a plurality of nodes (not shown) connected to one another by optical fibers. Additionally, an optical cross-over device (OXC) 130 enables communication between the first and second WDM ring networks 110 and 120.

Each of the first and second WDM ring networks 110 and 120 perform intra-network communications using a forward optical signal comprising the first through n-th channels λ11 to λ1n, and a backward optical signal comprising first through n-th channels λ21 to λ2n. Here, "n" is a natural number. The first one of two reference numerals suffixed to "λ" represents a channel designations of the advancing direction of an optical signal associated with the channel. Moreover, the second reference numeral designates the order of the channel. For example, "λ12" designates the second channel of a forward optical signal, whereas "λ23" designates the third channel of a backward optical signal.

The OXC device 130 includes first and second external ports 131 and 132, EP1 and EP2 that are connected to the first ring network 110, and third and fourth external ports 133 and 134, EP3 and EP4 that are connected to the second ring network 120. The OXC device 130 supports intra-network communication for each of the first and second ring networks 110 and 120. Additionally, the OXC device supports inter-network communication between the first and second ring networks 110 and 120. For example, the OXC device 130 outputs a forward optical signal, which is input thereto at the first external port 131, to the second external port 132 or fourth external port 134, while outputting a backward optical signal, which is input thereto at the fourth external port 131, to the first external port 131 or third external port 133.

Also, the OXC device 130 can perform a switching operation for the forward and backward optical signals in the unit of channels. For example, the OXC device 130 may output, to the second external port 132, the first through m-th channels λ11 to λ1m of the forward optical signal which is input to the first external port 131, while outputting the (m+1)-th through n-th channels λ 1(m+1) to λ1n of the forward optical signal to the fourth external port 134. Here, "m" is a natural number not more than "n".

FIG. 2 is a diagram illustrating a configuration of the OXC device shown in FIG. 1. As shown in FIG. 2, the OXC device 130 includes first through fourth wavelength selective couplers (WSCs) 141 to 144, that is, WSC1 to WSC4.

Further, there are 8 wavelength division multiplexers/demultiplexers (WDMs) 151 to 158, that is, WDM11 to WDM24, which are divided into first and second groups, each comprising first through fourth WDMs. There is also a plurality of switches (SWs) 161 to 166, that is, SW11 to SW2n, divided into two groups, that is, first and second groups, each consisting of first through n-th SWs.

With regard to certain designations, the "WDMxy" designates the y-th WDM of the x-th WDM group, and "SWxy" designates the y-th SW of the x-th SW group. For example, "WDM12" designates the second WDM of the first WDM group, whereas "SW23" designates the third SW of the second SW group. Each WSC has three ports, whereas each SW has four ports. Where it is assumed that one WSC or one SW is designated by a reference numeral "###", its n-th port is designated by "n" in the drawings while being designated, in the following description, by a reference numeral "###n". Also, it is assumed that the nn-th channel has an nn-th wavelength.

As shown in FIG. 2, the respective first ports 1411 to 1441 of the WSC1 and WSC4 141 to 144 are connected to the first through fourth external ports 131 to 134. Respective ports 1412 to 1442 of the WSC1 to WSC4 141 to 144 provide passages for forward optical signals, whereas respective ports 1413 to 1443 of the WSC1 to WSC4 141 to 144 provide passages for backward optical signals. The WSC1 and WSC3 141 and 143 output respective forward optical signals, which is input thereto at their first ports 1411 and 1431 and to their second ports 1412 and 1432, while outputting respective backward optical signals which is input thereto at their third ports 1433 and 1443 to their first ports 1411 and 1431.

On the other hand, FIG. 2 also shows the WSC2 and WSC4 142 and 144 output respective backward optical signals, which is input thereto at their first ports 1421 and 1441, to their third ports 1423 and 1443, while outputting respective forward optical signals, which is input thereto at their second ports 1422 and 1442, to their first ports 1421 and 1441.

Each of the WDM11 to WDM24 151 to 158 has only one multiplexing port, and n demultiplexing ports. The WDMs operate to demultiplex an optical signal which is input thereto at the multiplexing port in the channel unit. Respective channels of the demultiplexed optical signal are output to the demultiplexing ports, while multiplexing channels which is input thereto at the demultiplexing ports output the resultant optical signal to the multiplexing port.

For example, each switch of the SW11 to SW1n 161 to 163 in the first SW group has first through fourth ports: 1611 to 1614 in the case of SW11 161; 1621 to 1624 in the case of SW12 162; or 1631 to 1634 in the case of SW1n 163. Each switch is switched between a "bar" state, in which the first and second ports are connected to each other, and the third and fourth ports are connected to each other, and a "cross" state in which the first and fourth ports are connected to each other, and the second and third ports are connected to each other. For example, in the case of the SW11 161, its first and second ports 1611 and 1612 are connected to each other, and its third and fourth ports 1613 and 1614 are connected to each other in the bar state. Moreover, first and fourth ports 1611 and 1614 are connected to each other, and the second and third ports 1612 and 1613 are connected to each other in the cross state. Each switch in a respective SW group is connected at a first through fourth ports to respective corresponding demultiplexing ports of associated ones of the WDMs in the WDM group corresponding to the SW group.

For example, the SW1n 163 is connected at its first and third ports 1631 and 1633 to respective n-th demultiplexing ports of the WDM11 151 and WDM13 153. The SW1n 163 is also connected at its second and fourth ports 1632 and 1634 to respective n-th demultiplexing ports of the WDM12 152 and WDM14 154. Also, the SW2n 166 is connected at its first and third ports 1661 and 1663 to respective n-th demultiplexing ports of the WDM21 155 and WDM23 157. The SW2n is also connected at its second and fourth ports 1662 and 1664 to respective n-th demultiplexing ports of the WDM22 156 and WDM24 158.

Now, operation of the above-mentioned OXC device 130 will be described in detail in conjunction with the first case of outputting the channel λ11, which is input to the first external port 131, to the fourth external port 134, and the second case of outputting the channel λ22, which is input to the second external port 132, to the third external port 133.

The SW11 161 and SW22 165 are first set to be in their cross state by a control unit (not shown). In this case, the WSC1 141 outputs the channel λ11, which is input thereto at its first port 1411, to its second port 1412 to which the WDM11 151 is connected at its multiplexing port. The WDM11 151, which outputs the channel λ11 is inputted thereto at its multiplexing port to its first demultiplexing port to which the SW11 161 is connected at its first port 1611. The SW11 161 outputs from its third port 1613 the channel λ11 that is input thereto at its first port 1611 to which the WDM14 154 is connected at its first demultiplexing port. The WDM14 154 outputs the channel λ11 that is input thereto at its first demultiplexing port, to its multiplexing port to which the WSC4 144 is connected at its second port 1442. The WSC4 144 outputs the channel λ11, which is inputted thereto at its second port 1442, to its first port 1441.

Next, the second case will be described in detail. In this case, the WSC2 142 outputs the channel λ22, which is input thereto at its second port 1422, to its third port 1423 to which the WDM24 158 is connected at its multiplexing port. The WDM24 158 outputs the channel λ22, which is inputted thereto at its multiplexing port, to its second demultiplexing port at which the SW22 165 is connected to fourth port 1654. The SW22 165 outputs the channel λ22, which is input thereto at its fourth port 1654 to a first port 1651 to which the WDM21 155 is connected at its second demultiplexing port. The WDM21 155 outputs the channel λ22, which is input thereto at its second demultiplexing port, to a multiplexing port to which the WSC1 141 is connected at its third port 1413. The WSC1 141 outputs the channel λ22, which is input thereto at its third port 1413, to its first port 1411.

However, the conventional OXC device 130, which uses a plurality of WDMs and a plurality of 2×2 space switches, as mentioned above, has a problem of high manufacturing costs because the WDMs are expensive. Furthermore, the OXC device 130 requires a complex switching procedure because demultiplexing, switching, and multiplexing operations should be carried out upon switching one input channel. In addition, the OXC device 130 has a low channel extensibility because although the number of processible channels may be increased in accordance with an increase in the number of demultiplexing ports, in some cases it may be necessary to completely replace the existing WDMs with appropriate new ones appropriate for usage.

SUMMARY OF THE INVENTION

Therefore, the present invention provides a bi-directional OXC device that can simplify its switching operation while being manufactured at a lower cost than previously known.

The invention also provides a bi-directional OXC device having a high channel extensibility, as compared to conventional cases.

In accordance with the present invention, these objects are accomplished by providing an optical cross-connect device for communication between first and second optical networks communicating with each other using forward and backward optical signals each consisting of a plurality of channels, comprising: a first circulating part having first through fourth ports configured to output an optical signal, which is input to a higher-order port thereof, from a lower-order port thereof arranged adjacent to the higher-order port, the first circulating part being connected at the first and third ports thereof to the first optical network; a second circulating part having a first through fourth ports that are configured to output an optical signal, which is input to a higher-order port thereof, from a lower-order port thereof arranged adjacent to the higher-order port, the first circulating part being connected at the first and third ports thereof to the second optical network while being connected at the second and fourth ports thereof to the second and fourth ports of the first circulating part, respectively; a first reflecting part connected to respective second ports of the first and second circulating parts, and adapted to selectively reflect each channel of a forward optical signal which is input thereto or allow the channel to pass therethrough; and a second reflecting part connected to respective fourth ports of the first and second circulating parts, and adapted to selectively reflect each channel of a backward optical signal which is input thereto or allow the channel passage therethrough.

DETAILED DESCRIPTION OF THE PREFERRED EMBODIMENT

Figure 1:
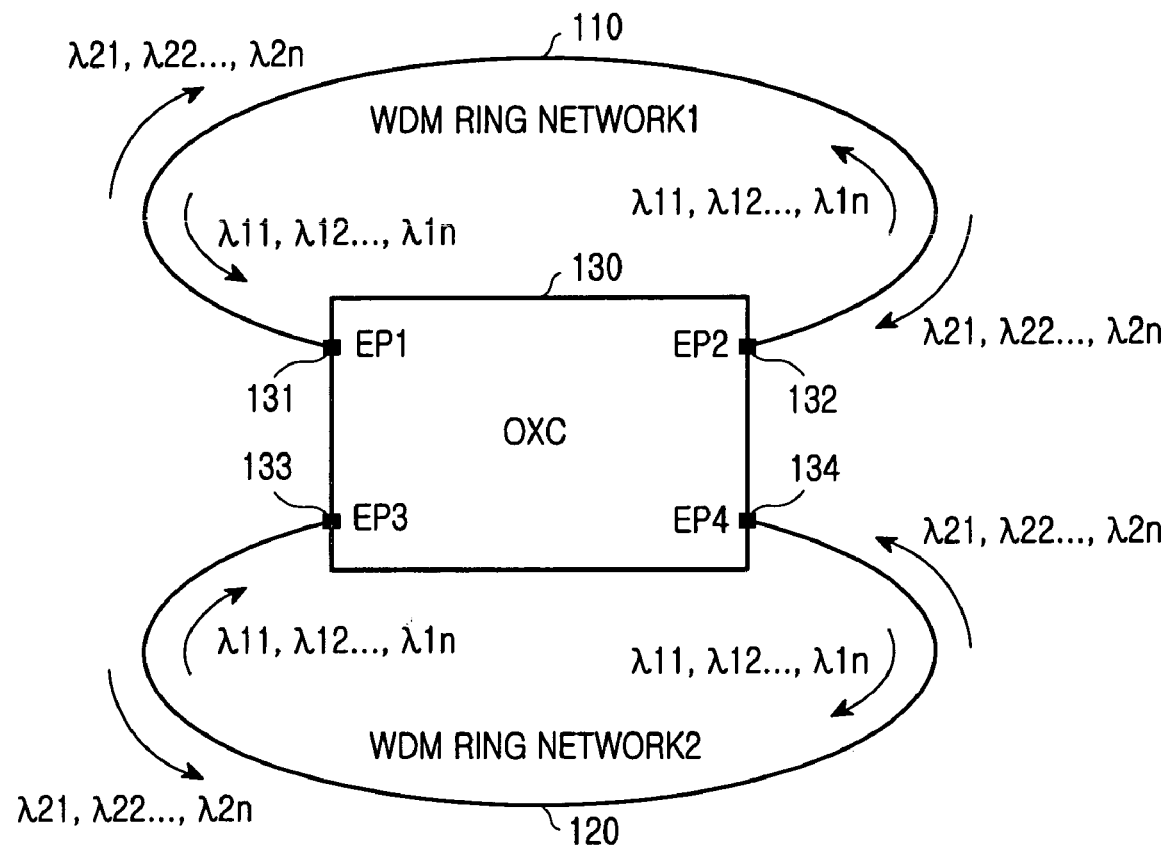
FIG. 1 is a block diagram illustrating the configuration of a conventional WDM optical network.
Figure 2:
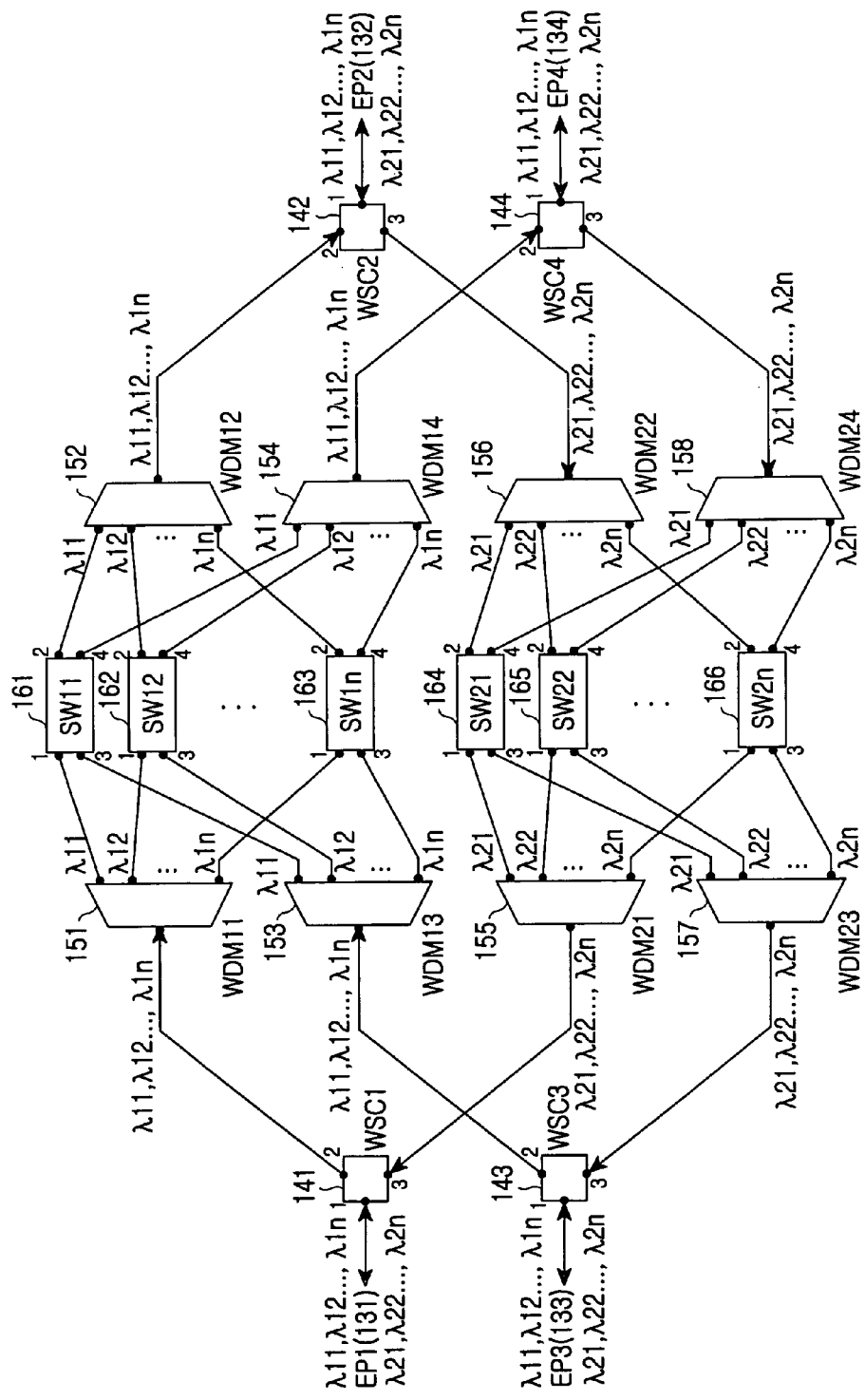
FIG. 2 is a diagram illustrating a configuration of the OXC device shown in FIG. 1.

Now, preferred embodiments of the present invention will be described in detail with reference to the annexed drawings. In the following description of the present invention, a detailed description of known functions and configurations incorporated herein will be omitted when it may obscure the subject matter of the present invention.

The present invention provides an OXC device including circulating parts (CPs) or circulators (Cs) each having a plurality of ports. Where it is assumed that one circulating part or circulator is designated by a reference numeral "###", its n-th port is designated by "n" in the drawings while being designated, in the following description, by a reference numeral "###n". Forward and backward optical signals are input to the OXC device. The forward optical signal consists of first through n-th channels $\lambda 11$ to $\lambda 1n$, whereas the backward optical signal consists of first through n-th channels $\lambda 21$ to $\lambda 2n$. Here, the first one of two reference numerals suffixed to "$\lambda$" representing a channel designates the advancing direction of an optical signal associated with the channel, whereas the second reference numeral designates the order of the channel. For example, "$\lambda 12$" designates the second channel of a forward optical signal, whereas "$\lambda 23$" designates the third channel of a backward optical signal. Also, it is assumed that the nn-th channel has an nn-th wavelength. Here, "n" is a natural number.

Figure 3:
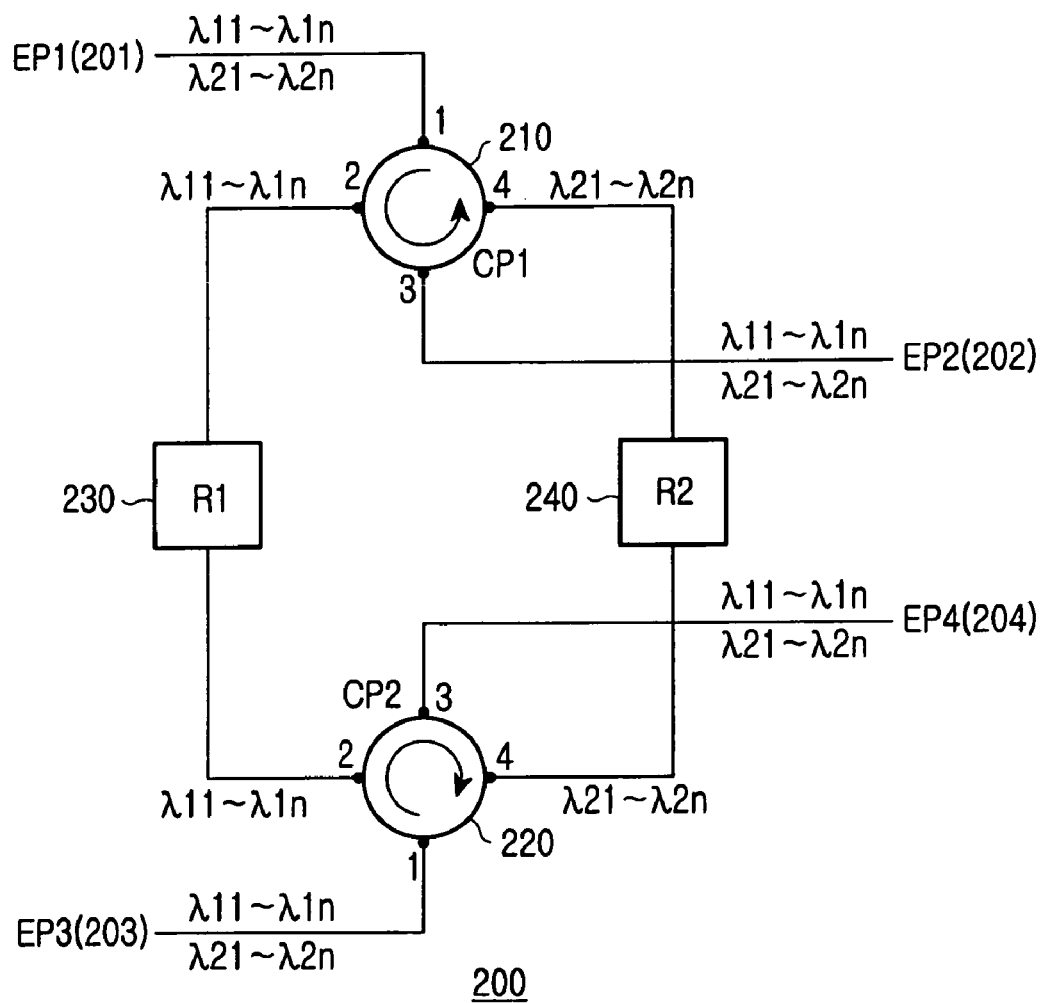
FIG. 3 is a block diagram illustrating the configuration of an OXC device according to the present invention.

FIG. 3 is a block diagram illustrating a configuration of the OXC device according to the present invention. As shown in FIG. 3, the OXC device designated by the reference numeral 200 includes first and second circulating parts 210 and 220, that is, CP1 and CP2, and first and second reflecting parts 230 and 240, that is, R1 and R2.

The first circulating part 210 includes first through fourth ports 210-1 to 210-4. The first circulating part 210 is connected at its first port 210-1 to a first external port 201, that is, EP1, while being connected at its third port 2103 to a second external port 202, that is, EP2. The first and second external ports 201 and 202 are connected to a first ring network (not shown). The first circulating part 210 operates to output an optical signal, which is input to a higher-order port thereof, from a lower-order port thereof arranged adjacent to the higher-order port. For example, the first circulating part 210 outputs a forward optical signal, which is input thereto at its first port 210-1, to its second port 210-2, while outputting a backward optical signal, which is input thereto at its fourth port 210-4, to its first port 210-1.

The second circulating part 220 includes first through fourth ports 220-1 to 220-4.

The second circulating part 220 is connected at its first port 220-1 to a third external port 203, that is, EP3, while being connected at its third port 220-3 to a fourth external port 204, that is, EP4. The third and fourth external ports 203 and 204 are connected to a second ring network (not shown). The second circulating part 220 operates to output an optical signal, which is input to a higher-order port thereof, from a lower-order port thereof arranged adjacent to the higher-order port. For example, the second circulating part 220 outputs a forward optical signal, which is input thereto at its first port 220-1, to its second port 220-2, while outputting a backward optical signal, which is input thereto at its fourth port 220-4, to its first port 220-1.

The first reflecting part 230 is connected to respective second ports 210-2 and 220-2 of the first and second circulating parts 210 and 220. The first reflecting part 230 serves to selectively reflect each channel having a forward optical signal which is input thereto, or to allow the channel to pass therethrough.

The second reflecting part 240 is connected to respective fourth ports 2104 and 2204 of the first and second circulating parts 210 and 220. The second reflecting part 240 serves to selectively reflect each channel of a backward optical signal which is input thereto, or to allow the channel to pass therethrough.

Now, operation of the OXC device 200 will be described in conjunction with the first case of outputting, to the fourth external port 204, the channel $\lambda 11$ of a forward optical signal which is input to the first external port 201 while outputting the remaining channels of the forward optical signal to the second external port 202, and the second case of outputting, to the third external port 203, the channel $\lambda 22$ of a backward optical signal which is input to the second external port 202 while outputting the remaining channels of the backward optical signal to the first external port 201.

The first and second reflecting parts 230 and 240 are set by a control unit (not shown) such that the first reflecting part 230 selectively allows the channel $\lambda 11$ to pass therethrough, whereas the second reflecting part 240 selectively allows the channel $\lambda 22$ to pass therethrough. First, the first case will be described. The forward optical signal which is input to the first external port 201 is first applied to the first port 210-1 of the first circulating part 210 which, in turn, outputs the forward optical signal to its second port 210-2 to which the first reflecting part 230 is connected. The first reflecting part 230 allows only the channel λ11 of the forward optical signal to pass therethrough while reflecting the remaining channels of the forward optical signal. The forward optical signal reflected from the first reflecting part 230 is re-inputted to the second port 210-2 of the first circulating part 210 which, in turn, outputs the forward optical signal to its third port 2103 connected to the second external port 202. The channel λ11 passing through the first reflecting part 230 is which is input to the second port 2202 of the second circulating part 220 which, in turn, outputs the channel λ11 to its third port 220-3 connected to the fourth external port 204.

Next, the second case will be described. The backward optical signal which is input to the second external port 202 is first applied to the third port 210-3 of the first circulating part 210 which, in turn, outputs the backward optical signal to its fourth port 210-4 to which the second reflecting part 240 is connected. The second reflecting part 240 allows only the channel λ22 of the backward optical signal to pass therethrough while reflecting the remaining channels of the backward optical signal. The backward optical signal reflected from the second reflecting part 240 is re-input to the fourth port 210-4 of the first circulating part 210 which, in turn, outputs the backward optical signal to its first port 210-1 connected to the first external port 201. The channel λ22 passing through the second reflecting part 240 is input to the fourth port 220-4 of the second circulating part 220 which, in turn, outputs the channel λ22 to its first port 220-1 connected to the third external port 203.

Figure 4:
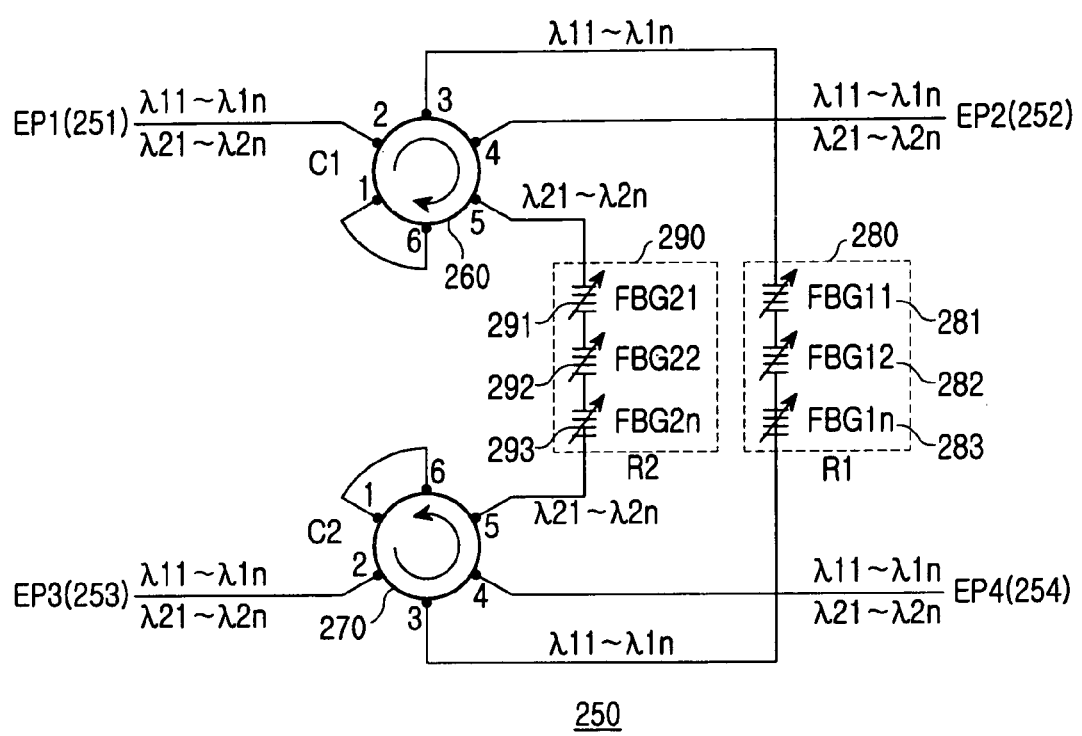
FIG. 4 is a block diagram illustrating the configuration of an OXC device according to a first embodiment of the present invention.

FIG. 4 is a block diagram illustrating the configuration of an OXC device according to a first embodiment of the present invention. As shown in FIG. 4, the OXC device designated by the reference numeral 250 includes first and second circulators 260 and 270, that is, C1 and C2, and first and second reflecting parts 280 and 290, that is, R1 and R2.

The first circulator 260 includes first through sixth ports 260-1 to 260-6. The first circulator 260 is connected at its second port 260-2 to a first external port 251, that is, EP1, while being connected at its fourth port 260-4 to a second external port 252, that is, EP2. The first and second external ports 251 and 252 are connected to a first ring network (not shown). The sixth port 2606 of the first circulator 260 is connected with the first port 2601. The first circulator 260 operates to output an optical signal, which is input to a higher-order port thereof, from a lower-order port thereof arranged adjacent to the higher-order port.

The second circulator 270 includes first through sixth ports 270-1 to 270-6. The second circulator 270 is connected at its second port 270-2 to a third external port 253, that is, EP3, while being connected at its fourth port 270-4 to a fourth external port 254, that is, EP4. The third and fourth external ports 253 and 254 are connected to a second ring network (not shown). The sixth port 270-6 of the second circulator 270 is connected with the first port 2701. The second circulator 270 operates to output an optical signal, which is input to a higher-order port thereof, from a lower-order port thereof arranged adjacent to the higher-order port.

The first reflecting part 280 is connected to respective third ports 2603 and 2703 of the first and second circulators 260 and 270. The first reflecting part 280 serves to selectively reflect each channel of a forward optical signal which is input thereto or allow the channel to pass therethrough. The first reflecting part 280 includes first through n-th fiber Bragg gratings (FBGs) 281 to 283, that is, FBG11 to FBG1n. In accordance with an ON/OFF state thereof, each of the FBG11 to FBG1n 281 to 283 serves to allow a forward optical signal, which is input thereto, to pass therethrough (in an OFF state), or to reflect only a predetermined channel of the forward optical signal (in an ON state). For example, the FBG11 281 is set to reflect only the channel λ11, whereas the FBG1n 283 is set to reflect only the channel λ1n.

The second reflecting part 290 is connected to respective fifth ports 2605 and 2705 of the first and second circulators 260 and 270. The second reflecting part 290 serves to selectively reflect each channel of a backward optical signal which is input thereto or allow the channel to pass therethrough. The second reflecting part 290 includes first through n-th FBGs 291 to 293, that is, FBG21 to FBG2n. In accordance with an ON/OFF state thereof, each of the FBG21 to FBG2n 291 to 293 serves to allow a backward optical signal, which is input thereto, to pass therethrough (in an OFF state), or to reflect only a predetermined channel of the backward optical signal (in an ON state). For example, the FBG21 291 is set to reflect only the channel λ21, whereas the FBG2n 293 is set to reflect only the channel λ2n.

Operation of the OXC device 250 will now be described in conjunction with the first case of outputting, to the fourth external port 254, only the channel λ11 of a forward optical signal which is input to the first external port 251 while outputting the remaining channels of the forward optical signal to the second external port 252, and the second case of outputting, to the third external port 253, only the channel λ22 of a backward optical signal which is input to the second external port 252 while outputting the remaining channels of the backward optical signal to the first external port 251.

The FBG11 281 of the first reflecting part 280 and the FBG22 292 of the second reflecting part 290 are initially set in an OFF state by a control unit (not shown), whereas the remaining FBGs of the first and second reflecting parts 280 and 290 are set to an ON state by the control unit.

For example, the forward optical signal which is input to the first external port 251 is first applied to the second port 260-2 of the first circulator 260, which in turn, outputs the forward optical signal to its third port 2603 where the first reflecting part 280 is connected. The first reflecting part 280 allows only the channel λ11 of the forward optical signal to pass therethrough while reflecting the remaining channels of the forward optical signal. The forward optical signal reflected from the first reflecting part 280 is re-input to the third port 260-3 of the first circulator 260 which, in turn, outputs the forward optical signal to its fourth port 2604 connected to the second external port 252. The channel λ11 passing through the first reflecting part 280 is which is input to the third port 270-3 of the second circulator 270 which, in turn, outputs the channel λ11 to its fourth port 270-4 connected to the fourth external port 254.

Next, the second case will be described in detail. The backward optical signal which is input to the second external port 252 is first applied to the fourth port 260-4 of the first circulator 260 which, in turn, outputs the backward optical signal to its fifth port 260-5 to which the second reflecting part 290 is connected. The second reflecting part 290 allows only the channel λ22 of the backward optical signal to pass therethrough while reflecting the remaining channels of the backward optical signal. The backward optical signal, which is reflected from the second reflecting part 290, is re-input to the fifth port 260-5 of the first circulator 260 which, in turn, outputs the backward optical signal to its sixth port 260-6 connected to its first port 260-1. The first circulator 260 then outputs the backward optical signal from its first port 260-1 to its second port 260-2 connected to the first external port 251. The channel λ22 passing through the second reflecting part 290 is which is input to the fifth port 270-5 of the second circulator 270 which, in turn, outputs the channel λ22 to its sixth port 270-6. The second circulator 270 then outputs the channel λ22 from its sixth port 2706 via its first port 270-1 to its second port 270-2 connected to the third external port 253.

Hereinafter, various embodiments of the present invention will be described. All of these embodiments use first and second reflecting parts identical to those of the first embodiment. Accordingly, no detailed description will be given in conjunction with the first and second reflecting parts, to simplify description.

Figure 5:
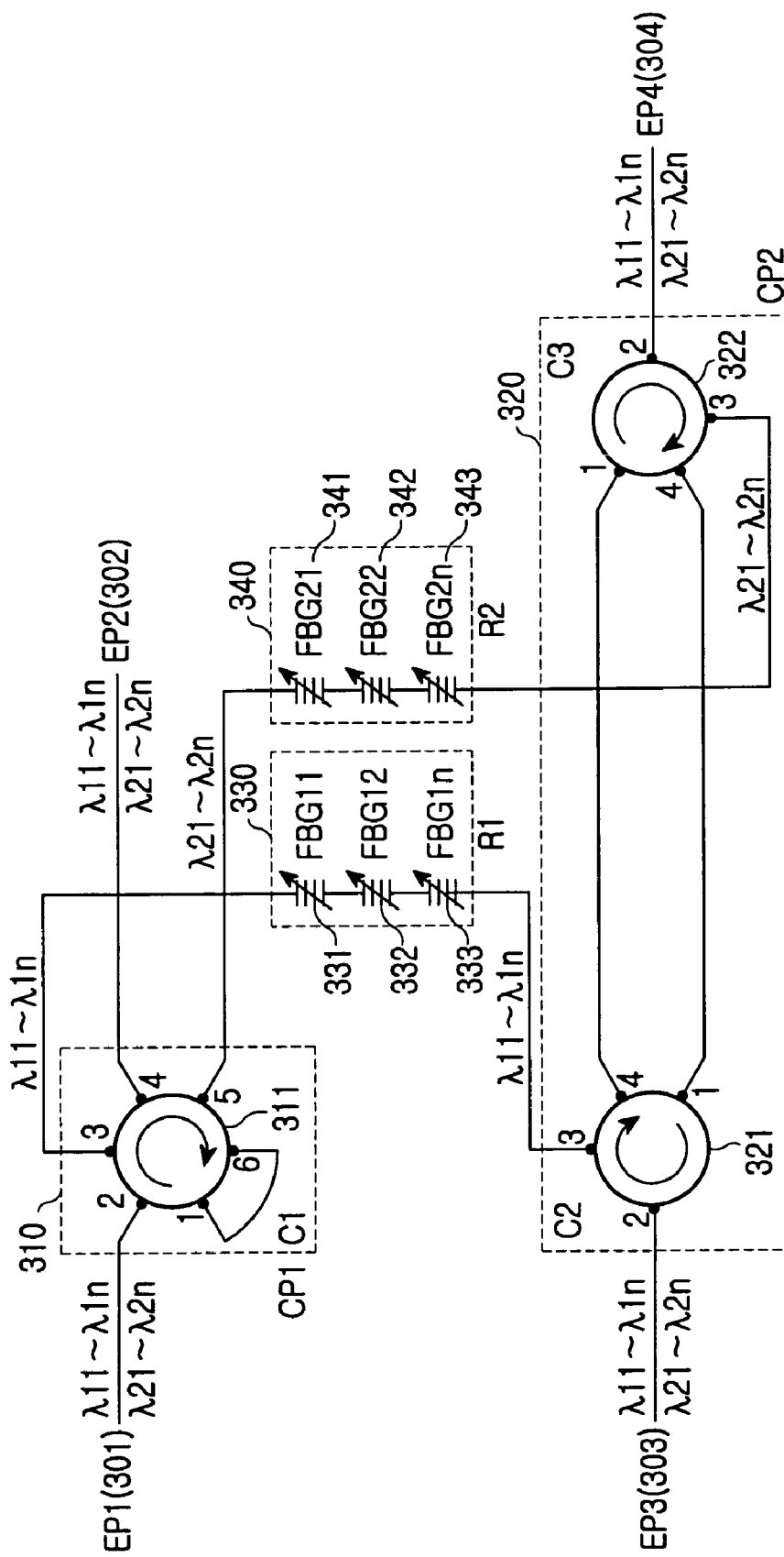
FIG. 5 is a block diagram illustrating the configuration of an OXC device according to a second embodiment of the present invention.

FIG. 5 is a block diagram illustrating the configuration of an OXC device according to a second embodiment of the present invention. As shown in FIG. 5, the OXC device designated by the reference numeral 300 includes first and second circulating parts 310 and 320 (CP1 and CP2), and first and second reflecting parts 330 and 340 (R1 and R2).

The first circulating part 310 includes a first circulator 311 (C1, having first through sixth ports 311-1 to 311-6. The first circulator 311 is connected at its second port 311-2 to a first external port 301 (EP1), while being connected at its fourth port 311-4 to a second external port 302 (EP2). The first and second external ports 301 and 302 are connected to a first ring network (not shown). The sixth port 311-6 of the first circulator 311 is connected with the first port 311-1. The first circulator 311 operates to output an optical signal, which is input to a higher-order port thereof, from a lower-order port thereof arranged adjacent to the higher-order port.

The second circulating part 320 includes second and third circulators 321 and 322 (C2 and C3), each having first through fourth ports: 321-1 to 321-4 in the case of the second circulator 321; or 322-1 to 322-4 in the case of the third circulator 322. The second circulator 321 is connected at its second port 321-2 to a third external port 303 (EP3), whereas the third circulator 322 is connected at its second port 322-2 to a fourth external port 304 (EP4). The second circulator 321 is connected at its first port 321-1 to the fourth port 322-4 of the third circulator 322, and at its fourth port 321-4 to the first port 322-1 of the third circulator 322. The third and fourth external ports 303 and 304 are connected to a second ring network (not shown). Each of the second and third circulators 321 and 322 operates to output an optical signal, which is input to a higher-order port thereof, from a lower-order port thereof arranged adjacent to the higher-order port.

The first reflecting part 330 is connected to respective third ports 311-3 and 321-3 of the first and second circulators 311 and 321. The second reflecting part 340 is connected to the fifth port 3115 of the first circulator 310 and the third port 3223 of the third circulator 322.

The operation of the OXC device 300 will be next described in conjunction with the first case of output to the fourth external port 304, as only the channel λ11 of a forward optical signal input to the first external port 301 while remaining channels of the forward optical signal are output to the second external port 302. In the second case of outputting, to the third external port 303, only the channel λ22 of a backward optical signal is input to the second external port 302 while outputting the remaining channels of the backward optical signal to the first external port 301.

The FBG11 331 of the first reflecting part 330 and the FBG22 342 of the second reflecting part 340 are first set to be in an OFF state by a control unit (not shown), whereas the remaining FBGs of the first and second reflecting parts 330 and 340 are set to be in an ON state by the control unit. First, the forward optical signal which is input to the first external port 301 is applied to the second port 311-2 of the first circulator 311. In turn, the forward optical signal id output to its third port 3113 to which the first reflecting part 330 is connected. The first reflecting part 330 allows only the channel λ11 of the forward optical signal to pass therethrough while reflecting the remaining channels of the forward optical signal. The forward optical signal reflected from the first reflecting part 330 is re-input to the third port 311-3 of the first circulator 311 in turn, outputs the forward optical signal to its fourth port 311-4 connected to the second external port 302. The channel λ11 passing through the first reflecting part 330 is input to the third port 321-3 of the second circulator 321 which, in turn, outputs the channel λ11 to its fourth port 321-4 connected to the first port 322-1 of the third circulator 322. The third circulator 322 outputs the channel λ11, which is input to its first port 322-1, to its second port 322-2 connected to the fourth external port 304.

Next, the second case will be described. The backward optical signal inputted to the second external port 302 is first applied to the fourth port 311-4 of the first circulator 311 which, in turn, outputs the backward optical signal to its fifth port 311-5 to which the second reflecting part 340 is connected. The second reflecting part 340 allows only the channel λ22 of the backward optical signal to pass therethrough while reflecting the remaining channels of the backward optical signal. The backward optical signal reflected from the second reflecting part 340 is re-input to the fifth port 311-5 of the first circulator 311 which, in turn, outputs the backward optical signal to its sixth port 311-6 connected to its first port 311-1. The first circulator 311 then outputs the backward optical signal from its first port 311-1 to its second port 311-2 connected to the first external port 301. The channel λ22 passing through the second reflecting part 340 is which is input to the third port 322-3 of the third circulator 322 which, in turn, outputs the channel λ22 to its fourth port 322-4 connected to the first port 321-1 of the second circulator 321. The second circulator 321 then outputs the channel λ22, inputted to its first port 321-1, to its second port 321-2 connected to the third external port 303.

Figure 6:
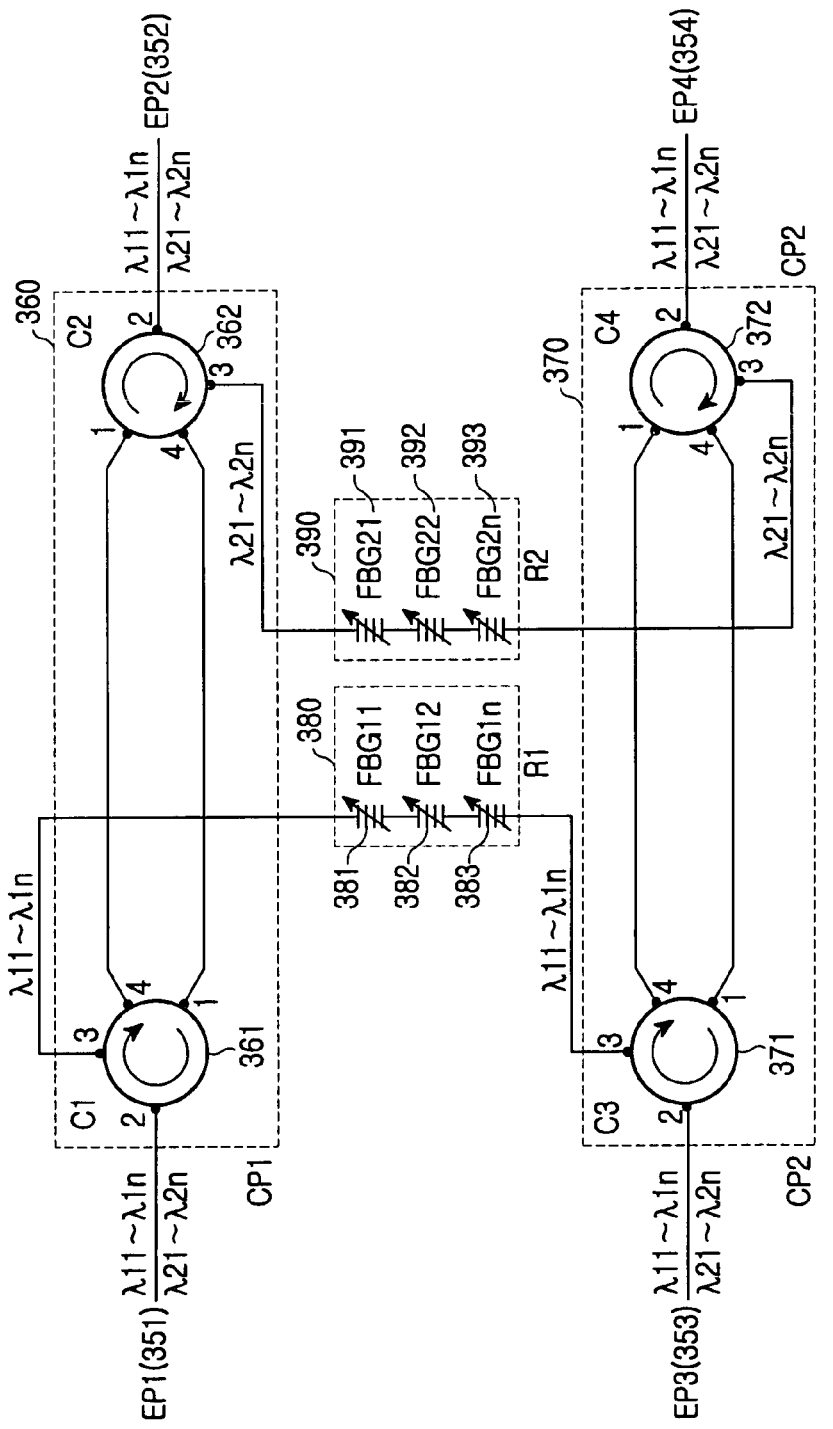
FIG. 6 is a block diagram illustrating the configuration of an OXC device according to a third embodiment of the present invention.

FIG. 6 is a block diagram illustrating the configuration of an OXC device according to a third embodiment of the present invention. As shown in FIG. 6, the OXC device designated by the reference numeral 350 includes first and second circulating parts 360 and 370 (CP1 and CP2), and first and second reflecting parts 380 and 390 (R1 and R2).

The first circulating part 360 includes first and second circulators 361 and 362 (C1 and C2), each having first through fourth ports: 3611 to 3614 in the case of the first circulator 361; or 362-1 to 362-4 in the case of the second circulator 362. The first circulator 361 is connected at its second port 361-2 to a first external port 351, that is, EP1, whereas the second circulator 362 is connected at its second port 362-2 to a second external port 352, that is, EP2. The first and second external ports 351 and 352 are connected to a first ring network (not shown). The first circulator 361 is connected at its first port 361-1 to the fourth port 362-4 of the second circulator 362, and at its fourth port 361-4 to the first port 362-1 of the second circulator 362. Each of the first and second circulators 361 and 362 operates to output an optical signal, which is input to a higher-order port thereof, from a lower-order port thereof arranged adjacent to the higher-order port.

The second circulating part 370 includes third and fourth circulators 371 and 372 (C3 and C4), each having first through fourth ports: 371-1 to 371-4 in the case of the third circulator 371; or 3721 to 372-4 in the case of the fourth circulator 372. The third circulator 371 is connected at its second port 371-2 to a third external port 353 (EP3), whereas the fourth circulator 372 is connected at its second port 372-2 to a fourth external port 354 (EP4). The third and fourth external ports 353 and 354 are connected to a second ring network (not shown). The third circulator 371 is connected at its first port 371-1 to the fourth port 372-4 of the fourth circulator 372, and at its fourth port 371-4 to the first port 372-1 of the fourth circulator 372. Each of the third and fourth circulators 371 and 372 operates to output an optical signal, which is input to a higher-order port thereof, from a lower-order port thereof arranged adjacent to the higher-order port.

The first reflecting part 380 is connected to respective third ports 3613 and 371-3 of the first and third circulators 361 and 371. The second reflecting part 390 is connected to respective third ports 362-3 and 372-3 of the second and fourth circulators 362 and 372.

The operation of the OXC device 350 will next be described in conjunction with the first case of outputting to the fourth external port 354 so that only the channel λ11 of a forward optical signal which is input to the first external port 351. The remaining channels of the forward optical signal are output to the second external port 352. In the second case, to the third external port 353 is output only if the channel λ22 of a backward optical signal is input to the second external port 352 while outputting the remaining channels of the backward optical signal to the first external port 351.

The FBG11 381 of the first reflecting part 380 and the FBG22 392 of the second reflecting part 390 are first set to be in an OFF state by a control unit (not shown), whereas the remaining FBGs of the first and second reflecting parts 380 and 390 are set to be in an On state by the control unit. First, the forward optical signal which is input to the first external port 351 is applied to the second port 361-2 of the first circulator 361. Then, in turn, the forward optical signal is output to its third port 361-3 to which the first reflecting part 380 is connected. The first reflecting part 380 allows only the channel λ11 of the forward optical signal to pass therethrough while reflecting the remaining channels of the forward optical signal. The forward optical signal reflected from the first reflecting part 380 is re-input to the third port 361-3 of the first circulator 361 which, in turn, outputs the forward optical signal to its fourth port 361-4 connected to the first port 362-1 of the second circulator 362. The second circulator 362 then outputs the forward optical signal, which is input to its first port 361-2, to its second port 362-2 connected to the second external port 352. The channel λ11 passing through the first reflecting part 380 is input to the third port 371-3 of the third circulator 371 which, in turn, outputs the channel λ11 to its fourth port 371-4 connected to the first port 372-1 of the fourth circulator 372. The fourth circulator 372 then outputs the channel λ11, which is input to its first port 372-1, to its second port 372-2 connected to the fourth external port 354.

The second case will be now described. The backward optical signal input to the second external port 352 is first applied to the second port 362-2 of the second circulator 362 which, in turn, outputs the backward optical signal to its third port 362-3 to which the second reflecting part 390 is connected. The second reflecting part 390 allows only the channel λ22 of the backward optical signal to pass therethrough, while reflecting the remaining channels of the backward optical signal. The backward optical signal reflected from the second reflecting part 390 is re-input to the third port 362-3 of the second circulator 362 which, in turn, outputs the backward optical signal to its fourth port 362-4 connected to the first port 361-1 of the first circulator 361. The first circulator 361 then outputs the backward optical signal, which is input to its first port 361-1, to its second port 361-2 connected to the first external port 351. The channel λ22 passing through the second reflecting part 390 is input to the third port 372-3 of the fourth circulator 372 which, in turn, outputs the channel λ22 to its fourth port 372-4 connected to the first port 371-1 of the third circulator 371. The third circulator 371 then outputs the channel λ22 that is input to its first port 371-1, to its second port 371-2 connected to the third external port 353.

Figure 7:
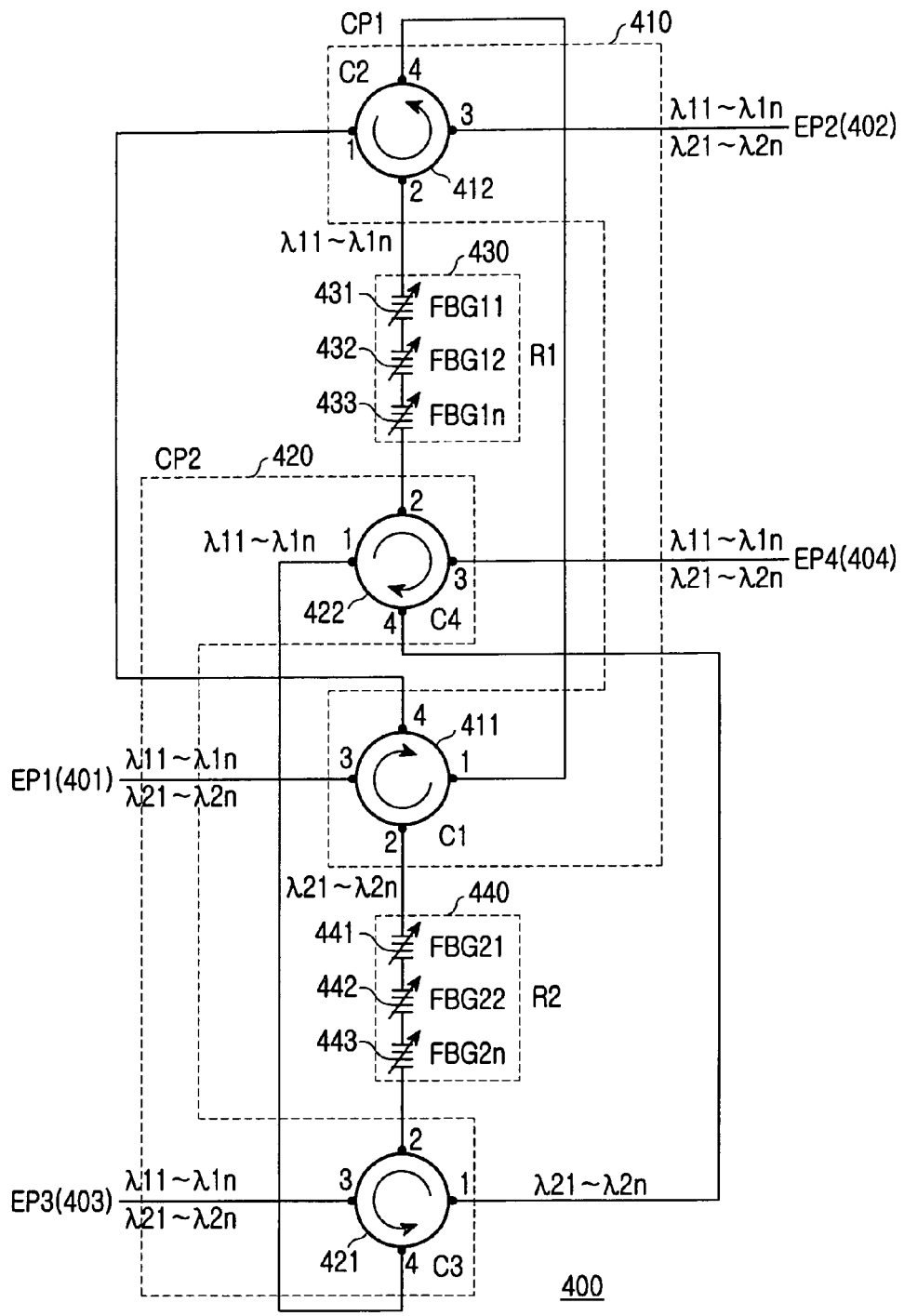
FIG. 7 is a block diagram illustrating the configuration of an OXC device according to a fourth embodiment of the present invention.

FIG. 7 is a block diagram illustrating the configuration of an OXC device according to a fourth embodiment of the present invention. As shown in FIG. 7, the OXC device designated by the reference numeral 400 includes first and second circulating parts 410 and 420 (CP1 and CP2), and first and second reflecting parts 430 and 440 (R1 and R2).

The first circulating part 410 includes first and second circulators 411 and 412 (C1 and C2), each having first through fourth ports: 411-1 to 411-4 in the case of the first circulator 411, or 412-1 to 412-4 in the case of the second circulator 412. The first circulator 411 is connected at its third port 411-3 to a first external port 401 (EP1), whereas the second circulator 412 is connected at its third port 412-3 to a second external port 402 (EP2). The first and second external ports 401 and 402 are connected to a first ring network (not shown). The first circulator 411 is connected at its first port 4 11-1 to the fourth port 412-4 of the second circulator 412, and at its fourth port 411-4 to the first port 412-1 of the second circulator 412. Each of the first and second circulators 411 and 412 operates to output an optical signal input from a higher-order port thereof, from a lower-order port thereof arranged adjacent to the higher-order port.

The second circulating part 420 includes third and fourth circulators 421 and 422, that is, C3 and C4, each having first through fourth ports: 421-1 to 421-4 in the case of the third circulator 421; or 422-1 to 422-4 in the case of the fourth circulator 422. The third circulator 421 is connected at its third port 421-3 to a third external port 403 (EP3), whereas the fourth circulator 422 is connected at its third port 422-3 to a fourth external port 404 (EP4). The third and fourth external ports 403 and 404 are connected to a second ring network (not shown). The third circulator 421 is connected at its first port 421-1 to the fourth port 422-4 of the fourth circulator 422, and at its fourth port 421-4 to the first port 422-1 of the fourth circulator 422. Each of the third and fourth circulators 421 and 422 operates to output an optical signal, input to a higher-order port thereof, from a lower-order port thereof arranged adjacent to the higher-order port.

The first reflecting part 430 is connected to respective second ports 412-2 and 422-2 of the second and fourth circulators 412 and 422. The second reflecting part 440 is connected to respective second ports 411-2 and 421-2 of the first and third circulators 411 and 421.

The operation of the OXC device 400 will now be described in conjunction with the first case of output to the fourth external port 404, wherein only the channel λ11 of a forward optical signal is input to the first external port 401, while outputting the remaining channels of the forward optical signal to the second external port 402. In the second case the output to the third external port 403, wherein only the channel λ22 of a backward optical signal which is input to the second external port 402 while outputting the remaining channels of the backward optical signal to the first external port 401.

The FBG11 431 of the first reflecting part 430 and the FBG22 442 of the second reflecting part 440 are first set in an OFF state by a control unit (not shown), whereas the remaining FBGs of the first and second reflecting parts 430 and 440 are set in an ON state by the control unit. First, the forward optical signal inputted to the first external port 401 is applied to the third port 411-3 of the first circulator 411, which in turn, outputs the forward optical signal to its fourth port 411-4 connected to the first port 412-1 of the second circulator 412. The second circulator 412 then outputs the forward optical signal, which is input to its first port 4121, to its second port 412-2 to which the first reflecting part 430 is connected. The first reflecting part 430 allows only the channel λ11 of the forward optical signal to pass therethrough while reflecting the remaining channels of the forward optical signal. The forward optical signal reflected from the first reflecting part 430 is re-input to the second port 412-2 of the second circulator 412. In turn, the second port 412-2 outputs the forward optical signal to its third port 412-3 connected to the second external port 402. The channel λ11 passing through the first reflecting part 430 is input to the second port 422-2 of the fourth circulator 422. In turn, the fourth circulator outputs the channel λ11 to its third port 422-3 connected to the fourth external port 404.

Another case will now be described. The backward optical signal is input to the second external port 402, and is first applied to the third port 412-3 of the second circulator 412. In turn, the third port 412-3 of the second conductor 412 outputs the backward optical signal to its fourth port 412-4 connected to the first port 411-1 of the first circulator 411. The first circulator 411 then outputs the backward optical signal, which is input to its first port 411, to its second port 411-2 to which the second reflecting part 440 is connected. The second reflecting part 440 allows only the channel λ22 of the backward optical signal to pass therethrough while reflecting the remaining channels of the backward optical signal. The backward optical signal reflected from the second reflecting part 440 is re-input to the second port 411-2 of the first circulator 411 which, in turn, outputs the backward optical signal to its third port 411-3 connected to the first external port 401. The channel λ22 passing through the second reflecting part 440 is inputted to the second port 421-2 of the third circulator 421, which in turn, outputs the channel λ22 to its third port 421-3 connected to the third external port 403.

Figure 8:
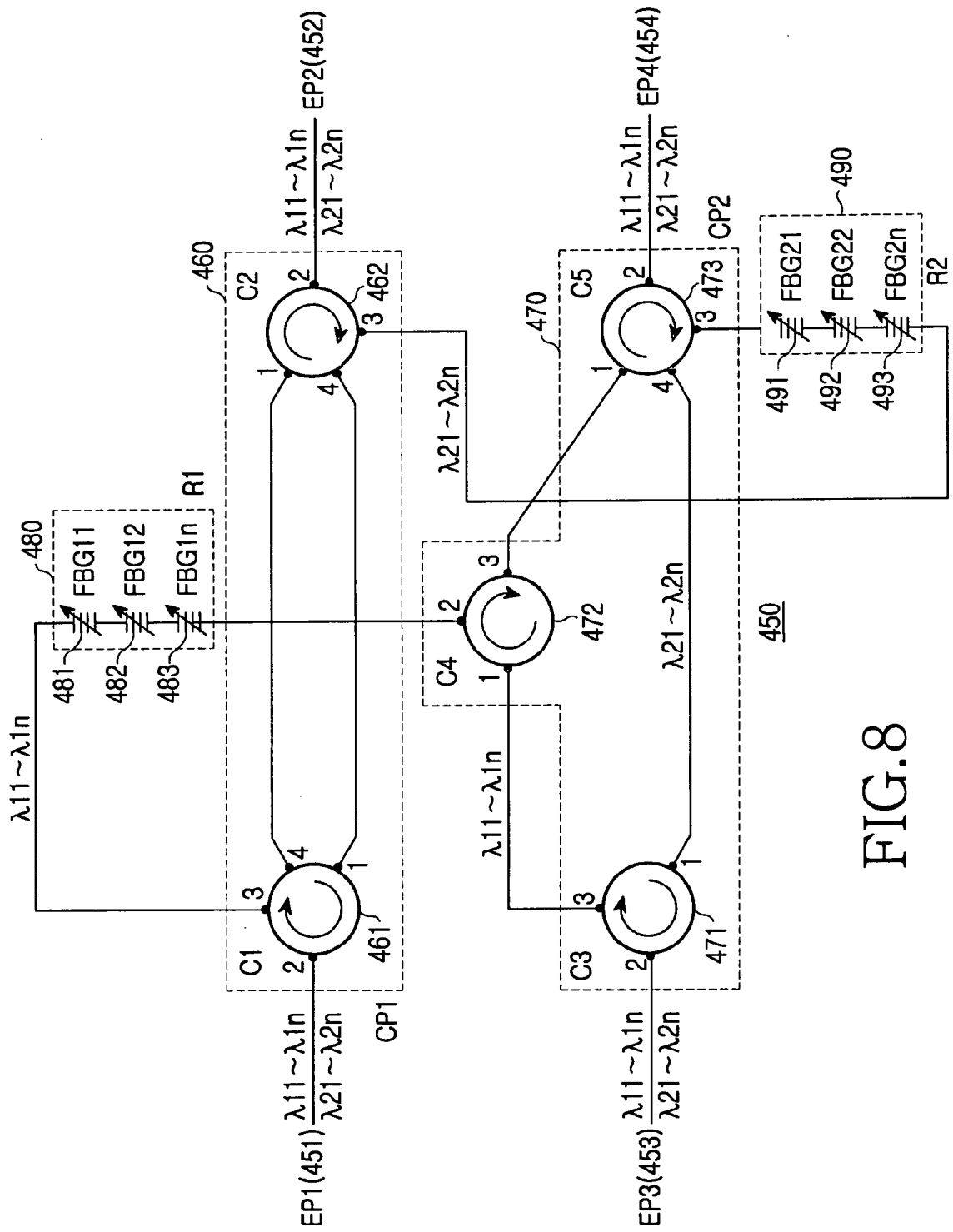
FIG. 8 is a block diagram illustrating the configuration of an OXC device according to a fifth embodiment of the present invention.

FIG. 8 is a block diagram illustrating the configuration of an OXC device according to a fifth embodiment of the present invention. As shown in FIG. 8, the OXC device designated by the reference numeral 450 includes first and second circulating parts 460 and 470 (CP1 and CP2), and first and second reflecting parts 480 and 490 (R1 and R2).

The first circulating part 460 includes first and second circulators 461 and 462 (C1 and C2), each circulator having first through fourth ports: 461-1 to 461-4 in the case of the first circulator 461; or 462-1 to 462-4 in the case of the second circulator 462. The first circulator 461 is connected at its second port 461-2 to a first external port 451 (EP1), whereas the second circulator 462 is connected at its second port 462-2 to a second external port 452 (EP2). The first and second external ports 451 and 452 are connected to a first ring network (not shown). The first circulator 461 is connected at its first port 4611 to the fourth port 462-4 of the second circulator 462, and at its fourth port 461-4 to the first port 462-1 of the second circulator 462. Each of the first and second circulators 461 and 462 operates so as to output an optical signal which is input to a higher-order port thereof from a lower-order port thereof arranged adjacent to the higher-order port.

The second circulating part 470 includes third and fourth circulators 471 and 472 (C3 and C4), each having first through third ports: 471-1 to 471-3 in the case of the third circulator 471; or 472-1 to 472-3 in the case of the fourth circulator 472. The second circulating part 470 also includes a fifth circulator 473 (C5), having first through fourth ports 473-1 to 473-4. The third circulator 471 is connected at its second port 471-2 to a third external port 453 (EP3), whereas the fifth circulator 473 is connected at its second port 473-2 to a fourth external port 454 (EP4). The third and fourth external ports 453 and 454 are connected to a second ring network (not shown). The third circulator 471 is connected at its first port 471-1 to the fourth port 473-4 of the fifth circulator 473, and at its third port 471-3 to the first port 472-1 of the fourth circulator 472. Also, the fourth circulator 472 is connected at its third port 4723 to the first port 473-1 of the fifth circulator 473. Each of the third through fifth circulators 471 to 473 operates to output an optical signal, which is input to a higher-order port thereof, from a lower-order port thereof arranged adjacent to the higher-order port.

The first reflecting part 480 is connected to the third port 461-3 of the first circulator 461 and the second port 472-2 of the fourth circulator 472. The second reflecting part 490 is connected to respective third ports 462-3 and 473-3 of the second and fifth circulators 462 and 473.

Now, operation of the OXC device 450 will be described in conjunction with the first case of outputting to the fourth external port 454 only the channel λ11 of a forward optical signal that is input to the first external port 451, while the remaining channels of the forward optical signal are output to the second external port 452. In the second case, of the output to the third external port 453, only the channel λ22 of a backward optical signal is input to the second external port 452, while the remaining channels of the backward optical signal are output to the first external port 451.

The FBG11 481 of the first reflecting part 480 and the FBG22 492 of the second reflecting part 490 are first set in an OFF state by a control unit (not shown), whereas the remaining FBGs of the first and second reflecting parts 480 and 490 are set in an ON state by the control unit. First, the forward optical signal which is input to the first external port 451 is applied to the second port 461-2 of the first circulator 461.1 In turn, the first circulator 461 outputs the forward optical signal to its third port 461-3 to which the first reflecting part 480 is connected. The first reflecting part 480 allows only the channel λ11 of the forward optical signal to pass therethrough while reflecting the remaining channels of the forward optical signal. The forward optical signal reflected from the first reflecting part 480 is re-input to the third port 461-3 of the first circulator 461 which, in turn, outputs the forward optical signal to its fourth port 461-4 connected to the first port 462-1 of the second circulator 462. The second circulator 462 then outputs the forward optical signal, which is input to its first port 461-2, to its second port 462-2 connected to the second external port 452. The channel λ11 passing through the first reflecting part 480 is input to the second port 472-2 of the fourth circulator 472. In turn, the fourth circulator outputs the channel λ11 to its third port 472-3 connected to the first port 473-1 of the fifth circulator 473. The fifth circulator 473 then outputs the channel λ11, which is input to its first port 473-1, to its second port 473-2 connected to the fourth external port 454.

Another case will now be described. The backward optical signal which is input to the second external port 452 is applied to the second port 462-2 of the second circulator 462. In turn, the second circulator 462 outputs the backward optical signal to its third port 462-3 to which the second reflecting part 490 is connected. The second reflecting part 490 allows only the channel λ22 of the backward optical signal to pass therethrough, while reflecting the remaining channels of the backward optical signal. The backward optical signal reflected from the second reflecting part 490 is re-input to the third port 462-3 of the second circulator 462. In turn, the second circulator 462 outputs the backward optical signal to its fourth port 462-4 connected to the first port 461-1 of the first circulator 461. The first circulator 461 then outputs the backward optical signal which was input to its first port 461-1, to its second port 461-2 connected to the first external port 451. The channel λ22 passing through the second reflecting part 490 is input to the third port 4733 of the fifth circulator 473 which, in turn, outputs the channel λ22 to its fourth port 473-4 connected to the first port 471-1 of the third circulator 471. The third circulator 471 then outputs the channel λ22, which is input to its first port 471-1, to its second port 4712 connected to the third external port 453.

Figure 9:
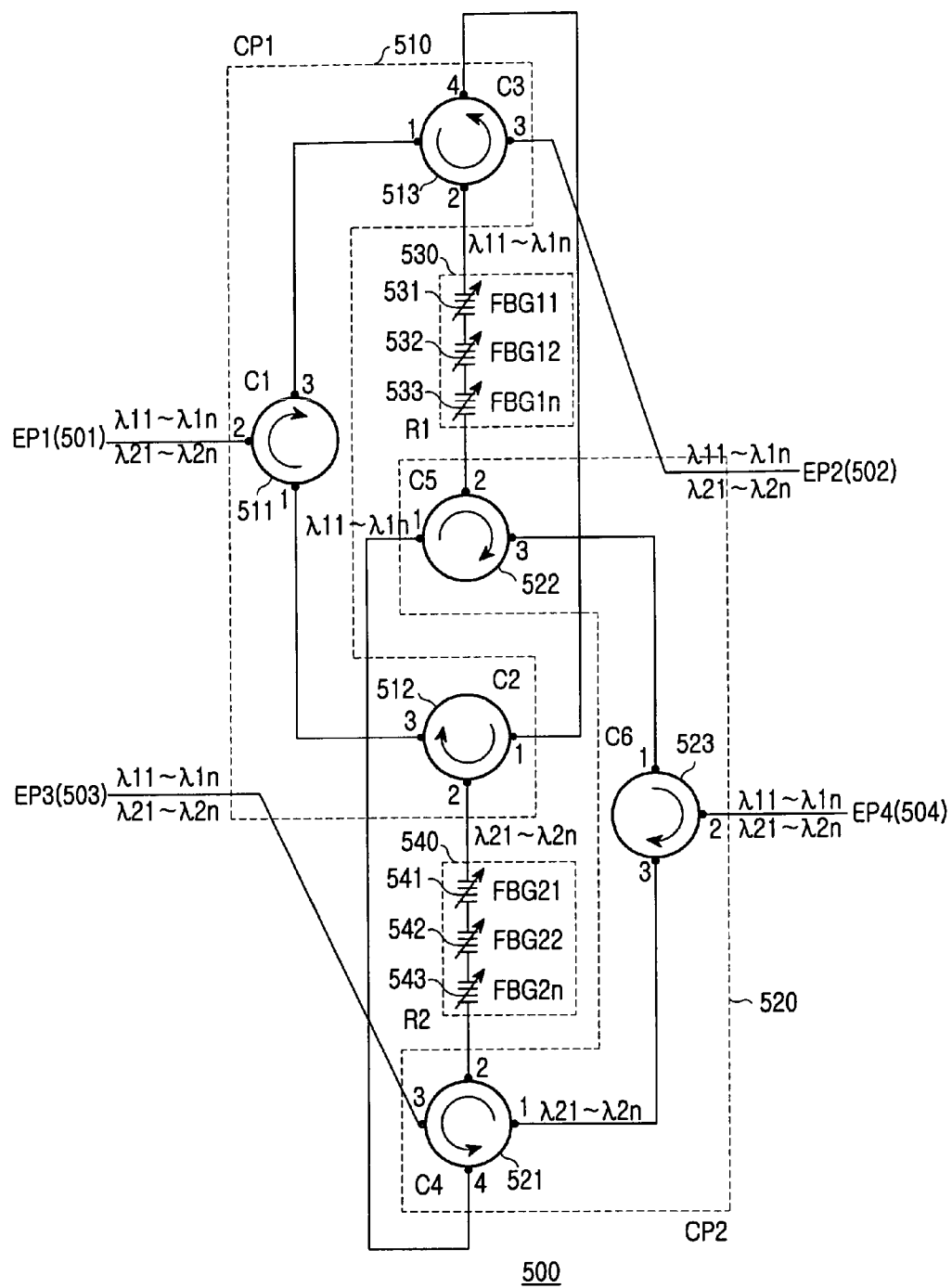
FIG. 9 is a block diagram illustrating the configuration of an OXC device according to a sixth embodiment of the present invention.

FIG. 9 is a block diagram illustrating the configuration of an OXC device according to a sixth embodiment of the present invention. As shown in FIG. 9, the OXC device designated by the reference numeral 500 includes first and second circulating parts 510 and 520 (CP1 and CP2), and first and second reflecting parts 530 and 540 (R1 and R2).

The first circulating part 510 includes first and second circulators 511 and 512 (C1 and C2), each having first through third ports: 511-1 to 511-3 in the case of the first circulator 511; or 512-1 to 512-3 in the case of the second circulator 512. The first circulating part 510 also includes a third circulator 513 (C3), having first through fourth ports 513-1 to 513-4. The first circulator 511 is connected at its second port 511-2 to a first external port 501 (EP1), whereas the third circulator 513 is connected at its third port 513-3 to a second external port 502 (EP2). The first and second external ports 501 and 502 are connected to a first ring network (not shown). The first circulator 511 is connected at its first port 5111 to the third port 5123 of the second circulator 512, and at its third port 5113 to the first port 5131 of the third circulator 513. The second circulator 512 is connected at its first port 512-1 to the fourth port 513-4 of the third circulator 513. Each of the first through third circulators 511 to 513 operates to output an optical signal, which is input to a higher-order port thereof, from a lower-order port thereof arranged adjacent to the higher-order port.

The second circulating part 520 includes a fourth circulator 521 (C4), having first through fourth ports 521-1 to 521-4, and fifth and sixth circulators 522 and 523 (C5 and C6), each having first through third ports: 522-1 to 522-3 in the case of the third circulator 522; or 523-1 to 523-3 in the case of the fourth circulator 523. The fourth circulator 521 is connected at its third port 521-3 to a third external port 503 (EP3), whereas the sixth circulator 523 is connected at its second port 523-2 to a fourth external port 504 (EP4). The third and fourth external ports 503 and 504 are connected to a second ring network (not shown). The fourth circulator 521 is connected at its fourth port 521-4 to the first port 522-1 of the fifth circulator 522, and at its first port 521-1 to the third port 523-3 of the sixth circulator 523. The fifth circulator 522 is connected at its third port 522-3 to the first port 523-1 of the sixth circulator 523. Each of the fourth through sixth circulators 521 to 523 operates to output an optical signal, input to a higher-order port thereof, from a lower-order port thereof arranged adjacent to the higher-order port.

The first reflecting part 530 is connected to respective second ports 513-2 and 522-2 of the third and fifth circulators 513 and 522. The second reflecting part 540 is connected to respective second ports 512-2 and 521-2 of the second and fourth circulators 512 and 521.

Now the operation of the OXC device 500 will be described in conjunction with the first case of outputting to the fourth external port 504, only the channel λ11 of a forward optical signal which is input to the first external port 501 while outputting the remaining channels of the forward optical signal to the second external port 502, and the second case of outputting, to the third external port 503, only the channel λ22 of a backward optical signal which is input to the second external port 502 while outputting the remaining channels of the backward optical signal to the first external port 501.

The FBG11 531 of the first reflecting part 530 and the FBG22 542 of the second reflecting part 540 are first set in an OFF state by a control unit (not shown), whereas the remaining FBGs of the first and second reflecting parts 530 and 540 are set in an ON state by the control unit. First, the forward optical signal is input to the first external port 501 and is applied to the second port 511-2 of the first circulator 511. In turn, the first circulator 511 outputs the forward optical signal to its third port 511-3 connected to the first port 513-1 of the third circulator 513. The third circulator 513 then outputs the forward optical signal, which is input to its first port 513-1, to its second port 513-2 to which the first reflecting part 530 is connected. The first reflecting part 530 allows only the channel λ11 of the forward optical signal to pass therethrough while reflecting the remaining channels of the forward optical signal. The forward optical signal reflected from the first reflecting part 530 is re-input to the second port 513-2 of the third circulator 513. In turn, the third circulator 513 outputs the forward optical signal to its third port 513-3 connected to the second external port 502. The channel λ11 passing through the first reflecting part 530 is which is input to the second port 522-2 of the fifth circulator 522 which, in turn, outputs the channel λ11 to its third port 5223 connected to the first port 523-1 of the sixth circulator 523. The sixth circulator 523 then outputs the channel λ11, which is input to its first port 523-1, to its second port 523-2 connected to the fourth external port 504.

Now another case will be described. The backward optical signal which is input to the second external port 502 is first applied to the third port 513-3 of the third circulator 513. In turn, the third circulator 513 outputs the backward optical signal to its fourth port 513-4 connected to the first port 512-1 of the second circulator 512. The second circulator 512 then outputs the backward optical signal, which is input to its first port 512-1, to its second port 512-2 to which the second reflecting part 540 is connected. The second reflecting part 540 allows only the channel λ22 of the backward optical signal to pass therethrough while reflecting the remaining channels of the backward optical signal. The backward optical signal reflected from the second reflecting part 540 is re-input to the second port 512-2 of the second circulator 512 which, in turn, outputs the backward optical signal to its third port 512-3 connected to the first port 5111 of the first circulator 511. The first circulator 511 then outputs the backward optical signal, inputted to its first port 511-1, to its second port 511-2 connected to the first external port 501. The channel λ22 passing through the second reflecting part 540 is inputted to the second port 521-2 of the fourth circulator 521. In turn, the fourth circulator outputs the channel λ22 to its third port 521-3 connected to the third external port 503.

Figure 10:
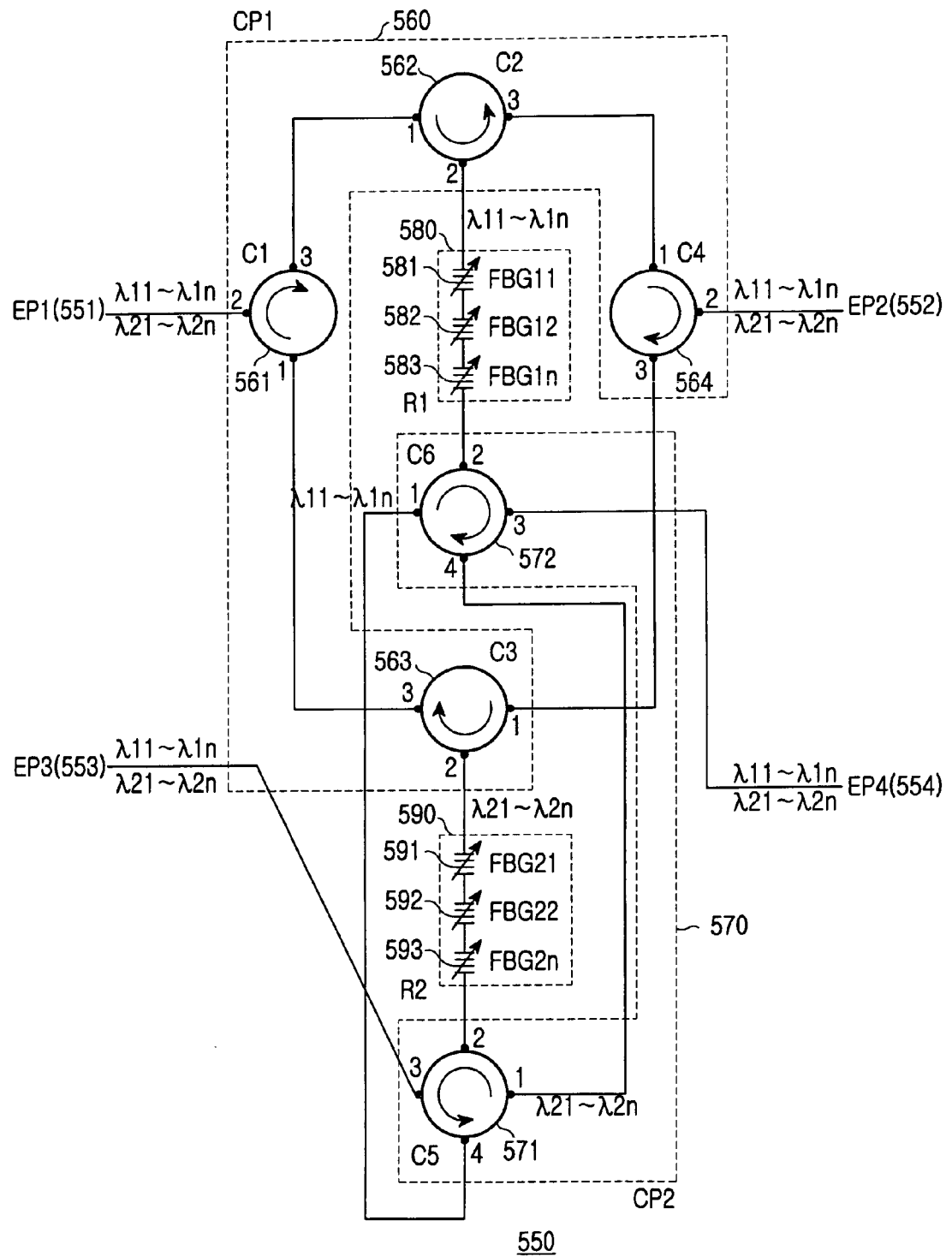
FIG. 10 is a block diagram illustrating the configuration of an OXC device according to a seventh embodiment of the present invention.

FIG. 10 is a block diagram illustrating the configuration of an OXC device according to a seventh embodiment of the present invention. As shown in FIG. 10, the OXC device designated by the reference numeral 550 includes first and second circulating parts 560 and 570 (CP1 and CP2), and first and second reflecting parts 580 and 590 (R1 and R2).

The first circulating part 560 includes first through fourth circulators 561 to 564 (C1 to C4), each circulator having first through third ports: 561-1 to 561-3 in the case of the first circulator 561; 5621 to 562-3 in the case of the second circulator 562, 563-1 to 563-3 in the case of the third circulator 563; or 564-1 to 564-3 in the case of the fourth circulator 564. The first circulator 561 is connected at its second port 561-2 to a first external port 551 (EP1), whereas the fourth circulator 564 is connected at its second port 564-2 to a second external port 552 (EP2). The first and second external ports 551 and 552 are connected to a first ring network (not shown). The first circulator 561 is connected at its first port 561-1 to the third port 563-3 of the third circulator 563, and at its third port 5613 to the first port 5621 of the second circulator 562. The second circulator 562 is connected at its third port 562-3 to the first port 564-1 of the fourth circulator 564. Also, the third circulator 563 is connected at its first port 563-1 to the third port 564-3 of the fourth circulator 564. Each of the first through fourth circulators 561 to 564 operates to output an optical signal, which is input to a higher-order port thereof, from a lower-order port thereof arranged adjacent to the higher-order port.

The second circulating part 570 includes fifth and sixth circulators 571 and 572 (C5 and C6), each having first through fourth ports: 571-1 to 571-4 in the case of the fifth circulator 571; or 572-1 to 572-4 in the case of the sixth circulator 572. The fifth circulator 571 is connected at its third port 571-3 to a third external port 553 (EP3), whereas the sixth circulator 572 is connected at its third port 572-3 to a fourth external port 554 (EP4). The third and fourth external ports 553 and 554 are connected to a second ring network (not shown). The fifth circulator 571 is connected at its first port 571-1 to the fourth port 572-4 of the sixth circulator 572, and at its fourth port 571-4 to the first port 5721 of the sixth circulator 572. Each of the fifth and sixth circulators 571 and 572 operates to output an optical signal, inputted to a higher-order port thereof, from a lower-order port thereof arranged adjacent to the higher-order port.

The first reflecting part 580 is connected to respective second ports 562-2 and 572-2 of the second and sixth circulators 562 and 572. The second reflecting part 590 is connected to respective second ports 563-2 and 571-2 of the third and fifth circulators 563 and 571.

Now the operation of the OXC device 550 will be described in conjunction with the first case of outputting to the fourth external port 554, only the channel λ11 of a forward optical signal inputted to the first external port 551. The remaining channels of the forward optical signal are output to the second external port 552, and the second case of outputting, to the third external port 553, only the channel λ22 of a backward optical signal inputted to the second external port 552 while outputting the remaining channels of the backward optical signal to the first external port 551.

The FBG11 581 of the first reflecting part 580 and the FBG22 592 of the second reflecting part 590 are first set in an OFF state by a control unit (not shown), whereas the remaining FBGs of the first and second reflecting parts 580 and 590 are set in an ON state by the control unit. First, the forward optical signal which is input to the first external port 551 is applied to the second port 561-2 of the first circulator 561, In turn, the first circulator 561 outputs the forward optical signal to its third port 561-3 connected to the first port 562-1 of the second circulator 562. The second circulator 562 then outputs the forward optical signal, which is input to its first port 562-1, to its second port 562-2 to which the first reflecting part 580 is connected. The first reflecting part 580 allows only the channel λ11 of the forward optical signal to pass therethrough, while reflecting the remaining channels of the forward optical signal. The forward optical signal reflected from the first reflecting part 580 is re-input to the second port 562-2 of the second circulator 562 which, in turn, outputs the forward optical signal to its third port 562-3 connected to the first port 564-1 of the fourth circulator 564. In turn, the fourth circulator 564 outputs the forward optical signal that was input to its first port 564-1, to its second port 564-2 connected to the second external port 552. The channel λ11 passing through the first reflecting part 580 is input to the second port 572-2 of the sixth circulator 572. In turn, the sixth circulator 572 outputs the channel λ11 to its third port 572-3 connected to the fourth external port 554.

Next, another case will be described. The backward optical signal input to the second external port 552 is first applied to the second port 5642 of the fourth circulator 564. In turn, the fourth circulator 564 outputs the backward optical signal to its third port 564-3 connected to the first port 563-1 of the third circulator 563. The third circulator 563 then outputs the backward optical signal, which is input to its first port 563-1, to its second port 563-2 to which the second reflecting part 590 is connected. The second reflecting part 590 allows only the channel λ22 of the backward optical signal to pass therethrough while reflecting the remaining channels of the backward optical signal. The backward optical signal reflected from the second reflecting part 590 is re-inputted to the second port 563-2 of the third circulator 563 which, in turn, outputs the backward optical signal to its third port 563-3 connected to the first port 561-1 o-f the first circulator 561. The first circulator 561 then outputs the backward optical signal, which was input to its first port 561-1, to its second port 561-2 connected to the first external port 551. The channel λ22 passing through the second reflecting part 590 is inputted to the second port 571-2 of the fifth circulator 571. In turn, the fifth circulator 571 outputs the channel λ22 to its third port 571-3 connected to the third external port 553.

Figure 11:
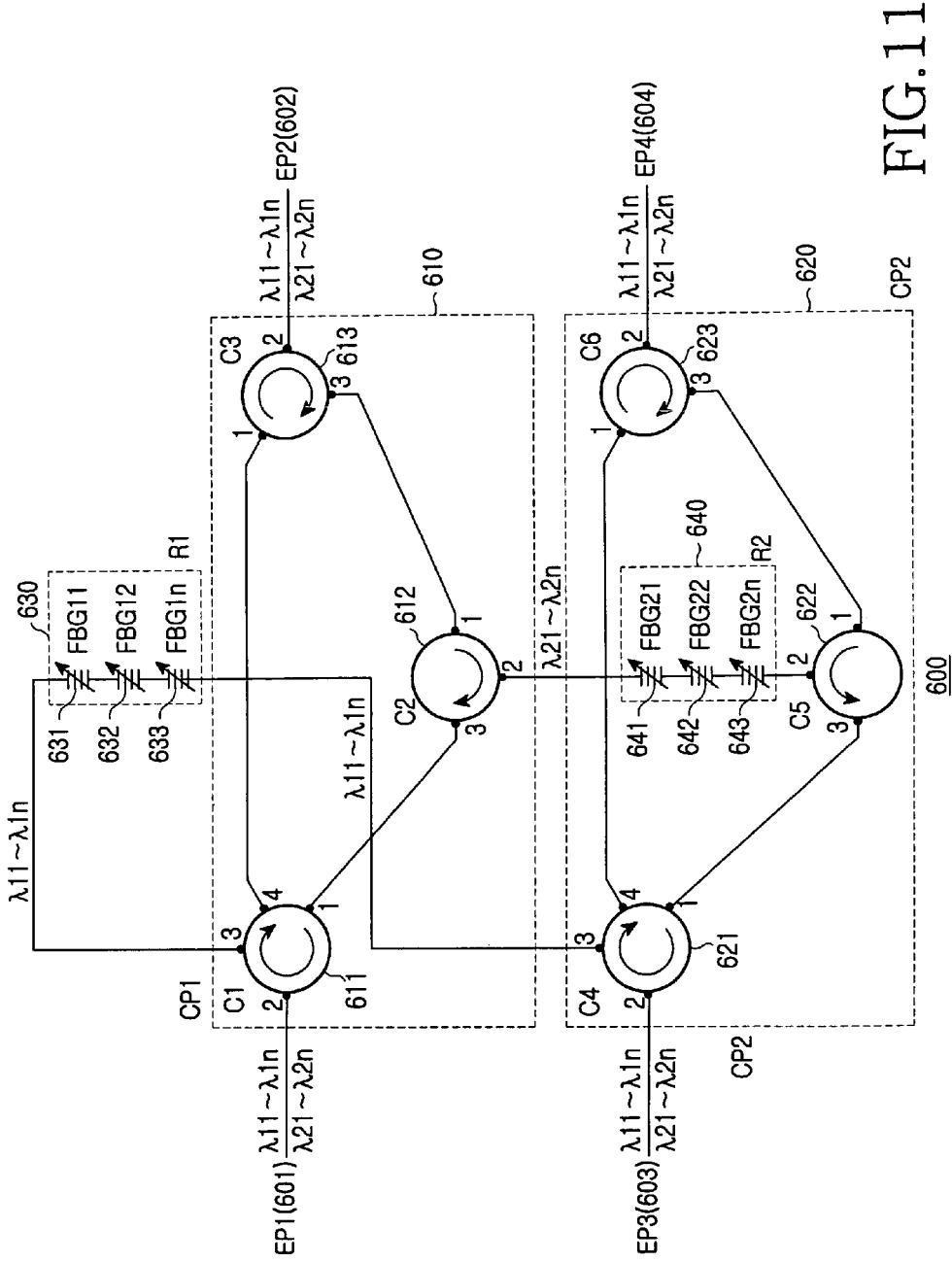
FIG. 11 is a block diagram illustrating the configuration of an OXC device according to an eighth embodiment of the present invention.

FIG. 11 is a block diagram illustrating the configuration of an OXC device according to an eighth embodiment of the present invention. As shown in FIG. 11, the OXC device designated by the reference numeral 600 includes first and second circulating parts 610 and 620 (CP1 and CP2), and first and second reflecting parts 630 and 640 (R1 and R2).

The first circulating part 610 includes a first circulator 611 (C1), having first through fourth ports 611-1 to 611-4, and second and third circulators 612 and 613 (C2 and C3), each having first through third ports: 612-1 to 612-3 in the case of the second circulator 612; or 613-1 to 613-3 in the case of the third circulator 613. The first circulator 611 is connected at its second port 611-2 to a first external port 601 (EP1), whereas the third circulator 613 is connected at its second port 613-2 to a second external port 602 (EP2). The first and second external ports 601 and 602 are connected to a first ring network (not shown). The first circulator 611 is connected at its first port 611-1 to the third port 612-3 of the second circulator 612, and at its fourth port 611-4 to the first port 613-1 of the third circulator 613. The second circulator 612 is connected at its first port 612-1 to the third port 613-3 of the third circulator 613. Each of the first through third circulators 611 to 613 operates to output an optical signal, inputted to a higher-order port thereof, from a lower-order port thereof arranged adjacent to the higher-order port.

The second circulating part 620 includes a fourth circulator 621 (C4), having first through fourth ports 621-1 to 621-4, and fifth and sixth circulators 622 and 623 (C5 and C6), each circulator having first through third ports: 622-1 to 622-3 in the case of the third circulator 622; or 623-1 to 623-3 in the case of the fourth circulator 623. The fourth circulator 621 is connected at its second port 621-2 to a third external port 603 (EP3), whereas the sixth circulator 623 is connected at its second port 623-2 to a fourth external port 604, (EP4). The third and fourth external ports 603 and 604 are connected to a second ring network (not shown). The fourth circulator 621 is connected at its first port 621-1 to the third port 622-3 of the fifth circulator 622, and at its fourth port 621-4 to the first port 623-1 of the sixth circulator 623. The fifth circulator 622 is connected at its first port 622-1 to the third port 623-3 of the sixth circulator 623. Each of the fourth through sixth circulators 621 to 623 operates to output an optical signal, which is input to a higher-order port thereof, from a lower-order port thereof arranged adjacent to the higher-order port.

The first reflecting part 630 is connected to respective third ports 611-3 and 621-3 of the first and fourth circulators 611 and 621. The second reflecting part 640 is connected to respective second ports 612-2 and 622-2 of the second and fifth circulators 612 and 622.

The operation of the OXC device 600 will now be described in conjunction with the first case of outputting, to the fourth external port 604, only the channel $\lambda 11$ of a forward optical signal input to the first external port 601 while outputting the remaining channels of the forward optical signal to the second external port 602. In the second case of there will be outputting, to the third external port 603, only the channel $\lambda 22$ of a backward optical signal inputted to the second external port 602 while outputting the remaining channels of the backward optical signal to the first external port 601.

The FBG11 631 of the first reflecting part 630 and the FBG22 642 of the second reflecting part 640 are first set in an OFF state by a control unit (not shown), whereas the remaining FBGs of the first and second reflecting parts 630 and 640 are set in an ON state by the control unit. First, the forward optical signal input to the first external port 601 is applied to the second port 611-2 of the first circulator 611 which, in turn, outputs the forward optical signal to its third port 611-3 to which the first reflecting part 630 is connected. The first reflecting part 630 allows only the channel $\lambda 11$ of the forward optical signal to pass therethrough while reflecting the remaining channels of the forward optical signal. The forward optical signal reflected from the first reflecting part 630 is re-input to the third port 611-3 of the first circulator 611 which, in turn, outputs the forward optical signal to its fourth port 611-4 connected to the first port 613-1 of the third circulator 613. The third circulator 613 then outputs the forward optical signal, inputted to its first port 613-1, to its second port 613-2 connected to the second external port 602. The channel $\lambda 11$ passing through the first reflecting part 630 is input to the third port 621-3 of the fourth circulator 621 which, in turn, outputs the channel $\lambda 11$ to its fourth port 621-4 connected to the first port 623-1 of the sixth circulator 623. The sixth circulator 623 then outputs the channel $\lambda 11$, input to its first port 6231, to its second port 623-2 connected to the fourth external port 604.

Now the second case will be described. The backward optical signal which is input to the second external port 602 is first applied to the second port 613-2 of the third circulator 613. In turn, the third circulator 613 outputs the backward optical signal to its third port 613-3 connected to the first port 612-1 of the second circulator 612. The second circulator 612 then outputs the backward optical signal, which is input to its first port 612-1, to its second port 612-2 to which the second reflecting part 640 is connected. The second reflecting part 640 allows only the channel $\lambda 22$ of the backward optical signal to pass therethrough while reflecting the remaining channels of the backward optical signal. The backward optical signal reflected from the second reflecting part 640 is re-which is input to the second port 612-2 of the second circulator 612 which, in turn, outputs the backward optical signal to its third port 612-3 connected to the first port 611-1 of the first circulator 611. The first circulator 611 then outputs the backward optical signal, which is input to its first port 611-1, to its second port 611-2 connected to the first external port 601. The channel $\lambda 22$ passing through the second reflecting part 640 is which is input to the second port 622-2 of the fifth circulator 622 which, in turn, outputs the channel $\lambda 22$ to its third port 622-3 connected to the first port 621-1 of the fourth circulator 621. The fourth circulator 621 then outputs the channel $\lambda 22$, which is input to its first port 6211, to its second port 621-2 connected to the third external port 603.

Figure 12:
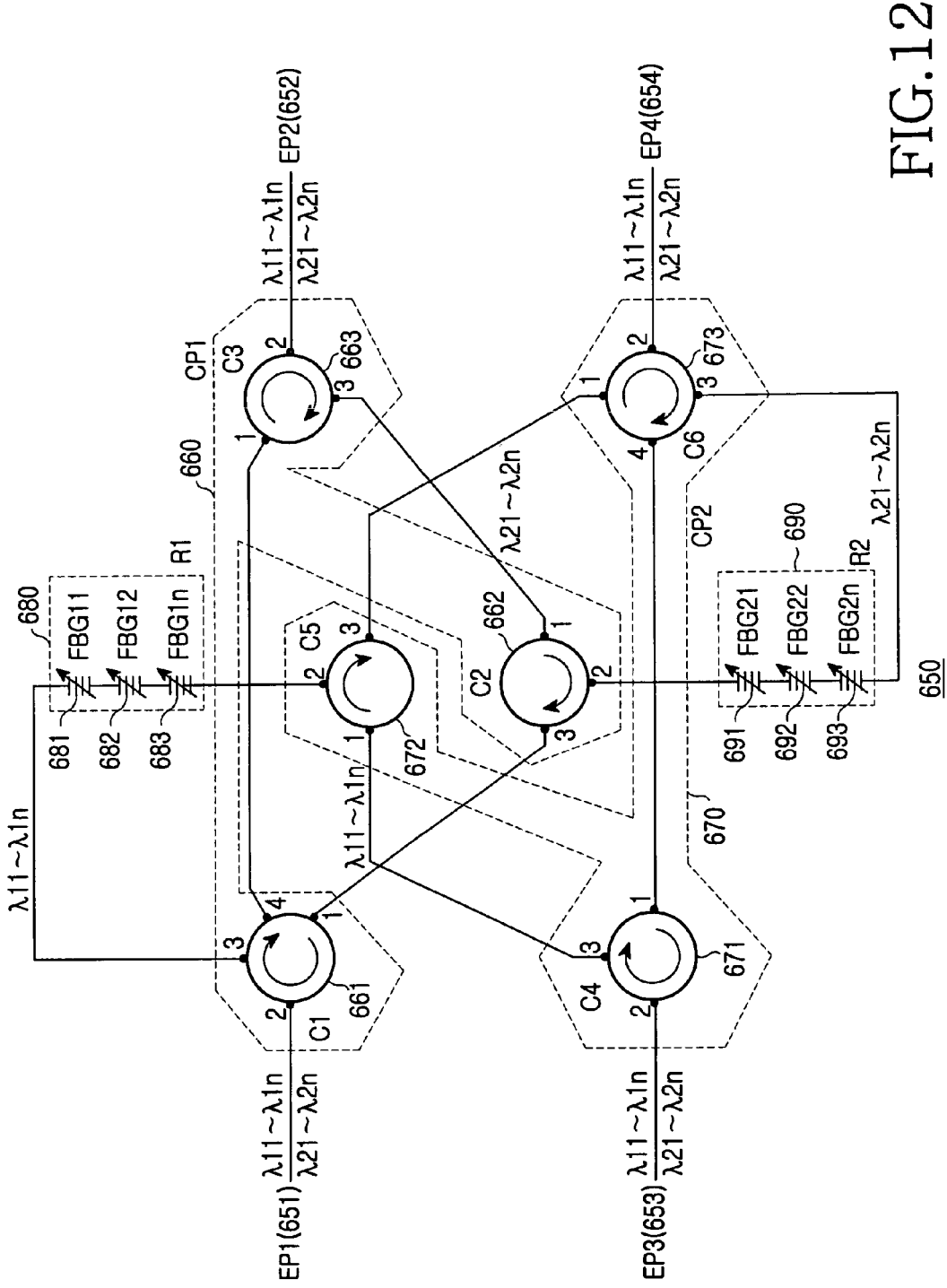
FIG. 12 is a block diagram illustrating the configuration of an OXC device according to a ninth embodiment of the present invention.

FIG. 12 is a block diagram illustrating the configuration of an OXC device according to a ninth embodiment of the present invention. As shown in FIG. 12, the OXC device designated by the reference numeral 650 includes first and second circulating parts 660 and 670 (CP1 and CP2), and first and second reflecting parts 680 and 690 (R1 and R2).

The first circulating part 660 includes a first circulator 661 (C1), having first through fourth ports 661-1 to 661-4, and second and third circulators 662 and 663 (C2 and C3), each circulator having first through third ports: 662-1 to 662-3 in the case of the second circulator 662; or 663-1 to 663-3 in the case of the third circulator 663. The first circulator 661 is connected at its second port 661-2 to a first external port 651 (EP1), whereas the third circulator 663 is connected at its second port 663-2 to a second external port 652 (EP2). The first and second external ports 651 and 652 are connected to a first ring network (not shown). The first circulator 661 is connected at its first port 661-1 to the third port 662-3 of the second circulator 662, and at its fourth port 661-4 to the first port 6631 of the third circulator 663. The second circulator 662 is connected at its first port 662-1 to the third port 663-3 of the third circulator 663. Each of the first through third circulators 661 to 663 operates to output an optical signal that is input to a higher-order port thereof, from a lower-order port thereof arranged adjacent to the higher-order port.

The second circulating part 670 includes fourth and fifth circulators 671 and 672 (C4 and C5), each circulator having first through third ports: 671-1 to 671-3 in the case of the fourth circulator 671; or 672-1 to 672-3 in the case of the fifth circulator 672. The second circulating part 670 also includes a sixth circulator 673 (C6), having first through fourth ports 673-1 to 673-4. The fourth circulator 671 is connected at its second port 671-2 to a third external port 653 (EP3), whereas the sixth circulator 673 is connected at its second port 673-2 to a fourth external port 654 (EP4). The third and fourth external ports 653 and 654 are connected to a second ring network (not shown). The fourth circulator 671 is connected at its first port 671-1 to the fourth port 673-4 of the sixth circulator 673, and at its third port 671-3 to the first port 672-1 of the fifth circulator 672. The fifth circulator 672 is connected at its third port 672-3 to the first port 673-1 of the sixth circulator 673. Each of the fourth through sixth circulators 671 to 673 operates to output an optical signal input to a higher-order port thereof from a lower-order port thereof arranged adjacent to the higher-order port.

The first reflecting part 680 is connected to the third port 661-3 of the first circulator 661 and the second port 672-2 of the fifth circulator 672. The second reflecting part 690 is connected to the second port 662-2 of the second circulator 662 and the third port 673-2 of the sixth circulator 673.

The operation of the OXC device 650 will now be described in conjunction with the first case of outputting, to the fourth external port 654, only the channel λ11 of a forward optical signal that is input to the first external port 651, while the remaining channels of the forward optical signal are output to the second external port 652. In the second case of outputting to the third external port 653, only the channel λ22 of a backward optical signal inputted to the second external port 652 while outputting the remaining channels of the backward optical signal to the first external port 651.

The FBG11 681 of the first reflecting part 680 and the FBG22 692 of the second reflecting part 690 are first set in an OFF state by a control unit (not shown), whereas the remaining FBGs of the first and second reflecting parts 680 and 690 are set in an ON state by the control unit. First, the first case will be described. The forward optical signal inputted to the first external port 651 is first applied to the second port 661-2 of the first circulator 661 which, in turn, outputs the forward optical signal to its third port 661-3 to which the first reflecting part 680 is connected. The first reflecting part 680 allows only the channel λ11 of the forward optical signal to pass therethrough while reflecting the remaining channels of the forward optical signal. The forward optical signal reflected from the first reflecting part 680 is re-input to the third port 661-3 of the first circulator 661 which, in turn, outputs the forward optical signal to its fourth port 661-4 connected to the first port 663-1 of the third circulator 663. The third circulator 663 then outputs the forward optical signal, inputted to its first port 663-1, to its second port 663-2 connected to the second external port 652. The channel λ11 passing through the first reflecting part 680 is inputted to the second port 672-2 of the fifth circulator 672 which, in turn, outputs the channel λ11 to its third port 672-3 connected to the first port 673-1 of the sixth circulator 673. The sixth circulator 673 then outputs the channel λ11, inputted to its first port 673-1, to its second port 673-2 connected to the fourth external port 654.

Next, the second case will be described. The backward optical signal input to the second external port 652 is first applied to the second port 663-2 of the third circulator 663. In turn, the third circulator 663 outputs the backward optical signal to its third port 663-3 connected to the first port 662-1 of the second circulator 662. The second circulator 662 then outputs the backward optical signal, input to its first port 662-1, to its second port 662-2 to which the second reflecting part 690 is connected. The second reflecting part 690 allows only the channel λ22 of the backward optical signal to pass therethrough while reflecting the remaining channels of the backward optical signal. The backward optical signal reflected from the second reflecting part 690 is re-input to the second port 662-2 of the second circulator 662 which, in turn, outputs the backward optical signal to its third port 662-3 connected to the first port 661-1 of the first circulator 661. The first circulator 661 then outputs the backward optical signal, inputted to its first port 661-1, to its second port 661-2 connected to the first external port 651. The channel λ22 passing through the second reflecting part 690 is inputted to the third port 673-3 of the sixth circulator 673 which, in turn, outputs the channel λ22 to its fourth port 673-4 connected to the first port 671-1 of the fourth circulator 671. The fourth circulator 671 then outputs the channel λ22, input to its first port 671-1, to its second port 671-2 connected to the third external port 653.

Figure 13:
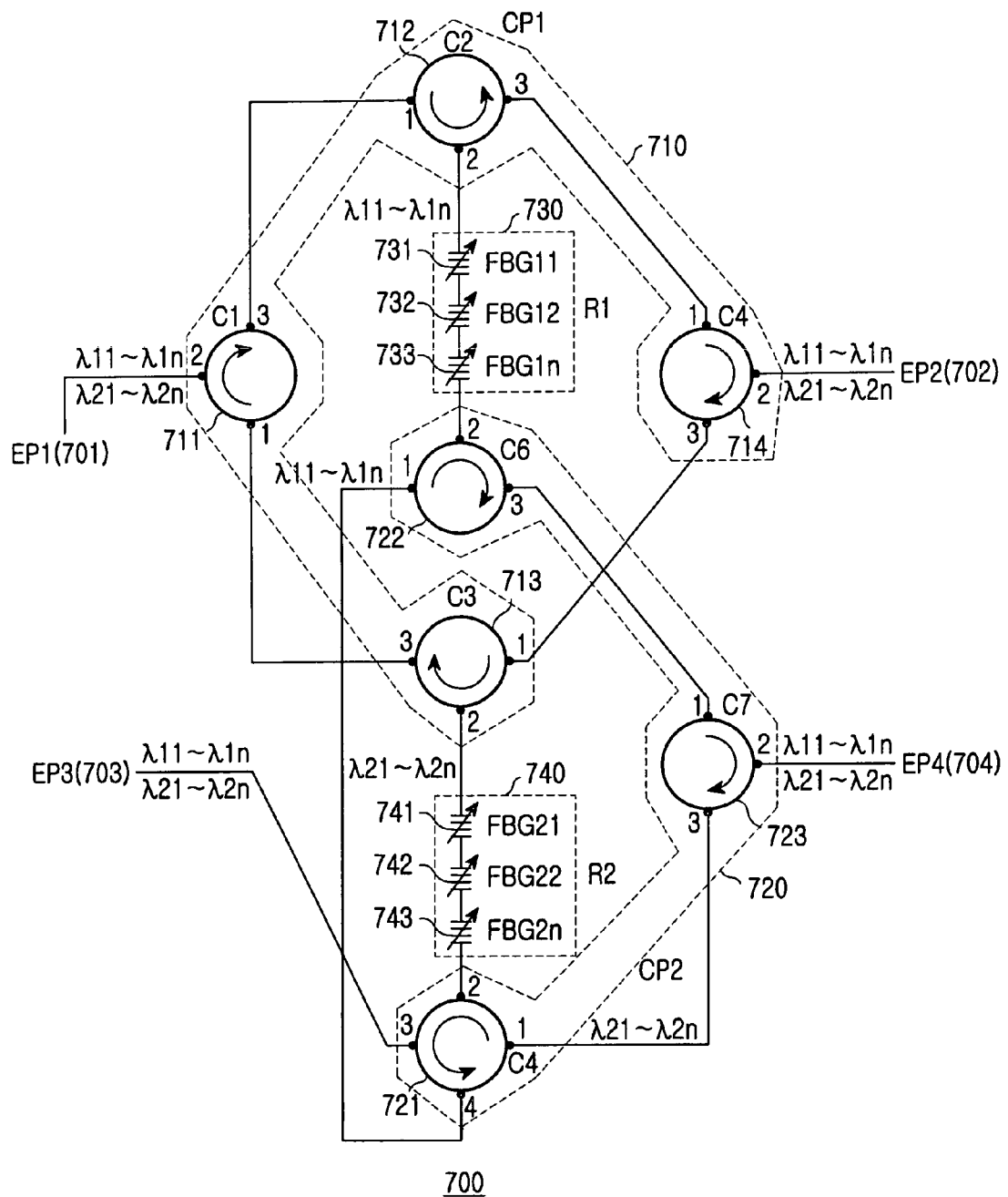
FIG. 13 is a block diagram illustrating the configuration of an OXC device according to a tenth embodiment of the present invention.

FIG. 13 is a block diagram illustrating the configuration of an OXC device according to a tenth embodiment of the present invention. As shown in FIG. 13, the OXC device designated by the reference numeral 700 includes first and second circulating parts 710 and 720 (CP1 and CP2), and first and second reflecting parts 730 and 740 (R1 and R2).

The first circulating part 710 includes first through fourth circulators 711 to 714 (C1 to C4), each having first through third ports 711-1 to 711-3 in the case of the first circulator 711; 712-1 to 712-3 in the case of the second circulator 712; 713-1 to 713-3 in the case of the third circulator 713; or 714-1 to 714-3 in the case of the fourth circulator 714. The first circulator 711 is connected at its second port 711-2 to a first external port 701 (EP1), whereas the fourth circulator 714 is connected at its second port 714-2 to a second external port 702 (EP2). The first and second external ports 701 and 702 are connected to a first ring network (not shown). The first circulator 711 is connected at its first port 711-1 to the third port 713-3 of the third circulator 713, and at its third port 711-3 to the first port 712-1 of the second circulator 712. The second circulator 712 is connected at its third port 712-3 to the first port 714-1 of the fourth circulator 714. The third circulator 713 is connected at its first port 713-1 to the third port 714-3 of the fourth circulator 714. Each of the first through fourth circulators 711 to 714 operates to output an optical signal, inputted to a higher-order port thereof, from a lower-order port thereof arranged adjacent to the higher-order port.

The second circulating part 720 includes a fifth circulator 721, that is, C5, having first through fourth ports 721-1 to 721-4, and sixth and seventh circulators 722 and 723 (C6 and C7), each circulator having first through third ports: 722-1 to 722-3 in the case of the sixth circulator 722; or 723-1 to 723-3 in the case of the seventh circulator 723. The fifth circulator 721 is connected at its third port 721-3 to a third external port 703 (EP3), whereas the seventh circulator 723 is connected at its second port 723-2 to a fourth external port 704 (EP4). The third and fourth external ports 703 and 704 are connected to a second ring network (not shown). The fifth circulator 721 is connected at its first port 721-1 to the third port 723-3 of the seventh circulator 723, and at its fourth port 7214 to the first port 7221 of the sixth circulator 722. The sixth circulator 722 is connected at its third port 722-3 to the first port 723-1 of the seventh circulator 723. Each of the fifth through seventh circulators 721 to 723 operates to output an optical signal, which is input to a higher-order port thereof, from a lower-order port thereof arranged adjacent to the higher-order port.

The first reflecting part 730 is connected to respective second ports 712-2 and 722-2 of the second and sixth circulators 712 and 722. The second reflecting part 740 is connected to respective second ports 713-2 and 721-2 of the third and fifth circulators 713 and 721.

Now the operation of the OXC device 700 will be described in conjunction with the first case of outputting, to the fourth external port 704, only the channel λ11 of a forward optical signal is input to the first external port 701. The remaining channels of the forward optical signal are output to the second external port 702. In the second case of outputting, to the third external port 703, only the channel λ22 of a backward optical signal inputted to the second external port 702 while outputting the remaining channels of the backward optical signal to the first external port 701.

The FBG11 731 of the first reflecting part 730 and the FBG22 742 of the second reflecting part 740 are first set in an OFF state by a control unit (not shown), whereas the remaining FBGs of the first and second reflecting parts 730 and 740 are set to be in their ON state by the control unit. First, the first case will be described. The forward optical signal inputted to the first external port 701 is first applied to the second port 711-2 of the first circulator 711 which, in turn, outputs the forward optical signal to its third port 7113 connected to the first port 712-1 of the second circulator 712. The second circulator 712 then outputs the forward optical signal, inputted to its first port 712-1, to its second port 712-2 to which the first reflecting part 730 is connected. The first reflecting part 730 allows only the channel λ11 of the forward optical signal to pass therethrough while reflecting the remaining channels of the forward optical signal. The forward optical signal reflected from the first reflecting part 730 is re-input to the second port 712-2 of the second circulator 712. In turn, the second circulator 712 outputs the forward optical signal to its third port 712-3 connected to the first port 714-1 of the fourth circulator 714. The fourth circulator 714 then outputs the forward optical signal, input to its first port 714-1, to its second port 714-2 connected to the second external port 702. The channel λ11 passing through the first reflecting part 730 is input to the second port 722-2 of the sixth circulator 722 which, in turn, outputs the channel λ11 to its third port 722-3 connected to the first port 723-1 of the seventh circulator 723. The seventh circulator 723 then outputs the channel λ11, which is input to its first port 723-1, to its second port 723-2 connected to the fourth external port 704.

Next, the second case will be described. The backward optical signal inputted to the second external port 702 is first applied to the second port 714-2 of the fourth circulator 714. In turn, the fourth circulator 714 outputs the backward optical signal to its third port 714-3 connected to the first port 713-1 of the third circulator 713. The third circulator 713 then outputs the backward optical signal, which is input to its first port 713-1, to its second port 713-2 to which the second reflecting part 740 is connected. The second reflecting part 740 allows only the channel λ22 of the backward optical signal to pass therethrough while reflecting the remaining channels of the backward optical signal. The backward optical signal reflected from the second reflecting part 740 is re-inputted to the second port 713-2 of the third circulator 713 which, in turn, outputs the backward optical signal to its third port 713-3 connected to the first port 7111 of the first circulator 711. The first circulator 711 then outputs the backward optical signal, which is input to its first port 711-1, to its second port 711-2 connected to the first external port 701. The channel λ22 passing through the second reflecting part 740 is input to the second port 721-2 of the fifth circulator 721. In turn, the fifth circulator 721 outputs the channel λ22 to its third port 721-3 connected to the third external port 703.

Figure 14:
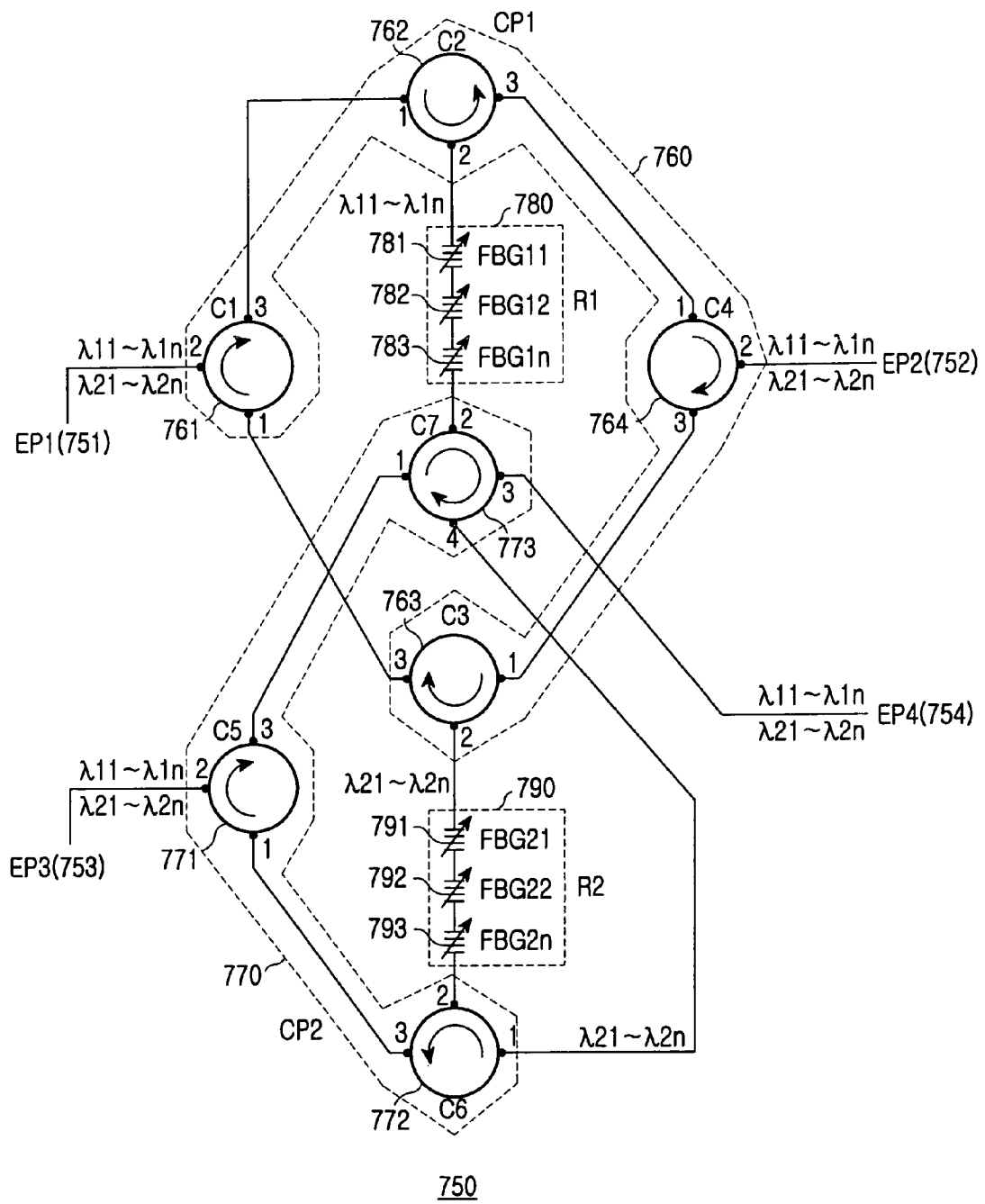
FIG. 14 is a block diagram illustrating the configuration of an OXC device according to an eleventh embodiment of the present invention.

FIG. 14 is a block diagram illustrating the configuration of an OXC device according to an eleventh embodiment of the present invention. As shown in FIG. 14, the OXC device designated by the reference numeral 750 includes first and second circulating parts 760 and 770 (CP1 and CP2), and first and second reflecting parts 780 and 790 (R1 and R2).

The first circulating part 760 includes first through fourth circulators 761 to 764 (C1 to C4), each having first through third ports 761-1 to 761-3 in the case of the first circulator 761; 762-1 to 762-3 in the case of the second circulator 762; 763-1 to 763-3 in the case of the third circulator 763; or 764-1 to 764-3 in the case of the fourth circulator 764. The first circulator 761 is connected at its second port 761-2 to a first external port 751 (EP1), whereas the fourth circulator 764 is connected at its second port 764-2 to a second external port 752 (EP2). The first and second external ports 751 and 752 are connected to a first ring network (not shown). The first circulator 761 is connected at its first port 761-1 to the third port 763-3 of the third circulator 763, and at its third port 761-3 to the first port 762-1 of the second circulator 762. The second circulator 762 is connected at its third port 762-3 to the first port 764-1 of the fourth circulator 764. The third circulator 763 is connected at its first port 763-1 to the third port 764-3 of the fourth circulator 764. Each of the first through fourth circulators 761 to 764 operates to output an optical signal, which is input to a higher-order port thereof, from a lower-order port thereof arranged adjacent to the higher-order port.

The second circulating part 770 includes fifth and sixth circulators 771 and 772 (C5 and C6), each having first through third ports: 771-1 to 771-3 in the case of the fifth circulator 771; or 772-1 to 772-3 in the case of the sixth circulator 772. The second circulating part 770 also includes a seventh circulator 773 (C7), having first through fourth ports 773-1 to 773-4. The fifth circulator 771 is connected at its second port 771-2 to a third external port 753 (EP3), whereas the seventh circulator 773 is connected at its third port 7733 to a fourth external port 754 (EP4). The third and fourth external ports 753 and 754 are connected to a second ring network (not shown). The fifth circulator 771 is connected at its first port 771-1 to the third port 772-3 of the sixth circulator 772, and at its third port 771-3 to the first port 773-1 of the seventh circulator 773. The sixth circulator 772 is connected at its first port 7721 to the fourth port 773-4 of the seventh circulator 773. Each of the fifth through seventh circulators 771 to 773 operates to output an optical signal, which is input to a higher-order port thereof, from a lower-order port thereof arranged adjacent to the higher-order port.

The first reflecting part 780 is connected to respective second ports 762-2 and 773-2 of the second and seventh circulators 762 and 773. The second reflecting part 790 is connected to respective second ports 763-2 and 772-2 of the third and sixth circulators 763 and 772.

Now, operation of the OXC device 750 will be described in conjunction with the first case of output to the fourth external port 754 only the channel λ11 of a forward optical signal input to the first external port 751. The remaining channels of the forward optical signal are output to the second external port 752. In the second case of outputting to the third external port 753, only the channel λ22 of a backward optical signal is input to the second external port 752. The remaining channels of the backward optical signal are output to the first external port 751.

The FBG11 781 of the first reflecting part 780 and the FBG22 792 of the second reflecting part 790 are first set in an OFF state by a control unit (not shown), whereas the remaining FBGs of the first and second reflecting parts 780 and 790 are set in an ON state by the control unit. First, the forward optical signal that is input to the first external port 751 is applied to the second port 761-2 of the first circulator 761. In turn, the first circulator 761 outputs the forward optical signal to its third port 761-3 connected to the first port 762-1 of the second circulator 762. The second circulator 762 then outputs the forward optical signal, which is input to its first port 762-1, to its second port 762-2 to which the first reflecting part 780 is connected. The first reflecting part 780 allows only the channel λ11 of the forward optical signal to pass therethrough while reflecting the remaining channels of the forward optical signal. The forward optical signal reflected from the first reflecting part 780 is re-input to the second port 762-2 of the second circulator 762, which in turn, outputs the forward optical signal to its third port 762-3 connected to the first port 764-1 of the fourth circulator 764. The fourth circulator 764 then outputs the forward optical signal that was input to its first port 764-1, to its second port 764-2 connected to the second external port 752. The channel λ11 passing through the first reflecting part 780 is input to the second port 773-2 of the seventh circulator 773 which, in turn, outputs the channel λ11 to its third port 773-3 connected to the fourth external port 754.

Next, the second case will be described. The backward optical signal input to the second external port 752 is applied to the second port 764-2 of the fourth circulator 764. In turn, the fourth calculator outputs the backward optical signal to its third port 764-3 connected to the first port 763-1 of the third circulator 763. The third circulator 763 then outputs the backward optical signal that was input to its first port 763-1, to its second port 763-2 to which the second reflecting part 790 is connected. The second reflecting part 790 allows only the channel λ22 of the backward optical signal to pass therethrough while reflecting the remaining channels of the backward optical signal. The backward optical signal reflected from the second reflecting part 790 is re-input to the second port 763-2 of the third circulator 763 and in turn outputs the backward optical signal to its third port 763-3 connected to the first port 761-1 of the first circulator 761. The first circulator 761 then outputs the backward optical signal, inputted to its first port 761-1, to its second port 761-2 connected to the first external port 751. The channel λ22 passing through the second reflecting part 790 is inputted to the second port 772-2 of the sixth circulator 772. In turn, the sixth circulator 772 outputs the channel λ22 to its third port 772-3 connected to the first port 771-1 of the fifth circulator 771. The fifth circulator 771 then outputs the channel λ22, inputted to its first port 771-1, to its second port 771-2 connected to the third external port 753.

Figure 15:
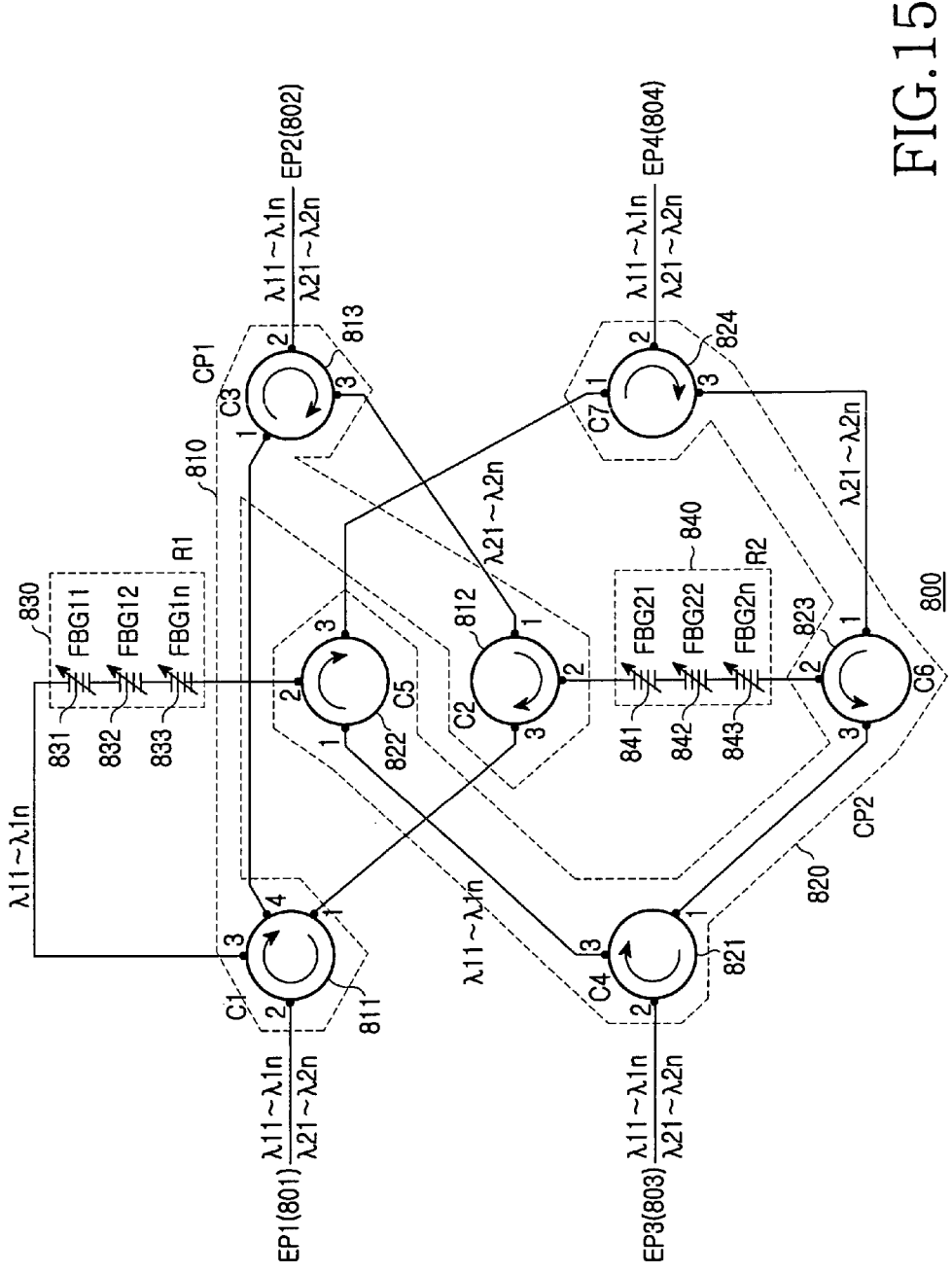
FIG. 15 is a block diagram illustrating the configuration of an OXC device according to a twelfth embodiment of the present invention.

FIG. 15 is a block diagram illustrating the configuration of an OXC device according to a twelfth embodiment of the present invention. As shown in FIG. 15, the OXC device designated by the reference numeral 800 includes first and second circulating parts 810 and 820 (CP1 and CP2), and first and second reflecting parts 830 and 840 (R1 and R2).

The first circulating part 810 includes a first circulator 811 (C1), having first through fourth ports 811-1 to 811-4, and second and third circulators 812 and 813 (C2 and C3), each circulator having first through third ports 812-1 to 812-3 in the case of the second circulator 812; or 813-1 to 813-3 in the case of the third circulator 813. The first circulator 811 is connected at its second port 811-2 to a first external port 801 (EP1), whereas the third circulator 813 is connected at its second port 813-2 to a second external port 802 (EP2). The first and second external ports 801 and 802 are connected to a first ring network (not shown). The first circulator 811 is connected at its first port 811-1 to the third port 812-3 of the second circulator 812, and at its fourth port 811-4 to the first port 8 131 of the third circulator 813. The second circulator 812 is connected at its first port 812-1 to the third port 813-3 of the third circulator 813. Each of the first through third circulators 811 to 813 operates to output an optical signal, which is input to a higher-order port thereof, from a lower-order port thereof arranged adjacent to the higher-order port.

The second circulating part 820 includes fourth through seventh circulators 821 to 824 (C4 to C7), each having first through third ports: 821-1 to 821-3 in the case of the fourth circulator 821; 822-1 to 822-3 in the case of the fifth circulator 822; 823-1 to 823-3 in the case of the sixth circulator 823; or 824-1 to 824-3 in the case of the seventh circulator 824. The fourth circulator 821 is connected at its second port 821-2 to a third external port 803 (EP3), whereas the seventh circulator 824 is connected at its second port 824-2 to a fourth external port 804 (EP4). The third and fourth external ports 803 and 804 are connected to a second ring network (not shown). The fourth circulator 821 is connected at its first port 821-1 to the third port 823-3 of the sixth circulator 823, and at its third port 821-3 to the first port 822-1 of the fifth circulator 822. The fifth circulator 822 is connected at its third port 822-3 to the first port 824-1 of the seventh circulator 824. The sixth circulator 823 is connected at its first port 823-1 to the third port 824-3 of the seventh circulator 824. Each of the fourth through seventh circulators 821 to 824 operates to output an optical signal which is input to a higher-order port thereof, from a lower-order port thereof arranged adjacent to the higher-order port.

The first reflecting part 830 is connected to the third port 811-3 of the first circulator 811 and the second port 822-2 of the fifth circulator 822. The second reflecting part 840 is connected to respective second ports 812-2 and 823-2 of the second and sixth circulators 812 and 823.

Now, operation of the OXC device 800 will be described in conjunction with the first case of outputting, to the fourth external port 804, only the channel λ11 of a forward optical signal which is input to the first external port 801 while outputting the remaining channels of the forward optical signal to the second external port 802, and the second case of outputting, to the third external port 803, only the channel λ22 of a backward optical signal inputted to the second external port 802 while outputting the remaining channels of the backward optical signal to the first external port 801.

The FBG11 831 of the first reflecting part 830 and the FBG22 842 of the second reflecting part 840 are first set in an OFF state by a control unit (not shown), whereas the remaining FBGs of the first and second reflecting parts 830 and 840 are set in an ON state by the control unit. First, the first case will be described. The forward optical signal inputted to the first external port 801 is first applied to the second port 811-2 of the first circulator 811 which, in turn, outputs the forward optical signal to its third port 811-3 to which the first reflecting part 830 is connected. The first reflecting part 830 allows only the channel λ11 of the forward optical signal to pass therethrough while reflecting the remaining channels of the forward optical signal. The forward optical signal reflected from the first reflecting part 830 is re-input to the third port 811-3 of the first circulator 811 which, in turn, outputs the forward optical signal to its fourth port 811-4 connected to the first port 813-1 of the third circulator 813. The third circulator 813 then outputs the forward optical signal, inputted to its first port 813-1, to its second port 813-2 connected to the second external port 802. The channel λ11 passing through the first reflecting part 830 is inputted to the second port 822-2 of the fifth circulator 822. In turn, the fifth circulator outputs the channel λ11 to its third port 822-3 connected to the first port 824-1 of the seventh circulator 824. The seventh circulator 824 then outputs the channel λ11, inputted to its first port 824-1, to its second port 824-2 connected to the fourth external port 804.

Next, the second case will be described. The backward optical signal inputted to the second external port 802 is first applied to the second port 813-2 of the third circulator 813 which, in turn, outputs the backward optical signal to its third port 813-3 connected to the first port 812-1 of the second circulator 812. The second circulator 812 then outputs the backward optical signal, inputted to its first port 812-1, to its second port 812-2 to which the second reflecting part 840 is connected. The second reflecting part 840 allows only the channel λ22 of the backward optical signal to pass therethrough while reflecting the remaining channels of the backward optical signal. The backward optical signal reflected from the second reflecting part 840 is re-input to the second port 812-2 of the second circulator 812 which, in turn, outputs the backward optical signal to its third port 812-3 connected to the first port 811-1 of the first circulator 811. The first circulator 811 then outputs the backward optical signal, inputted to its first port 8111, to its second port 811-2 connected to the first external port 801. The channel λ22 passing through the second reflecting part 840 is inputted to the second port 823-2 of the sixth circulator 823 which, in turn, outputs the channel λ22 to its third port 8233 connected to the first port 8211 of the fourth circulator 821. The fourth circulator 821 then outputs the channel λ22, inputted to its first port 821-1, to its second port 821-2 connected to the third external port 803.

Figure 16:
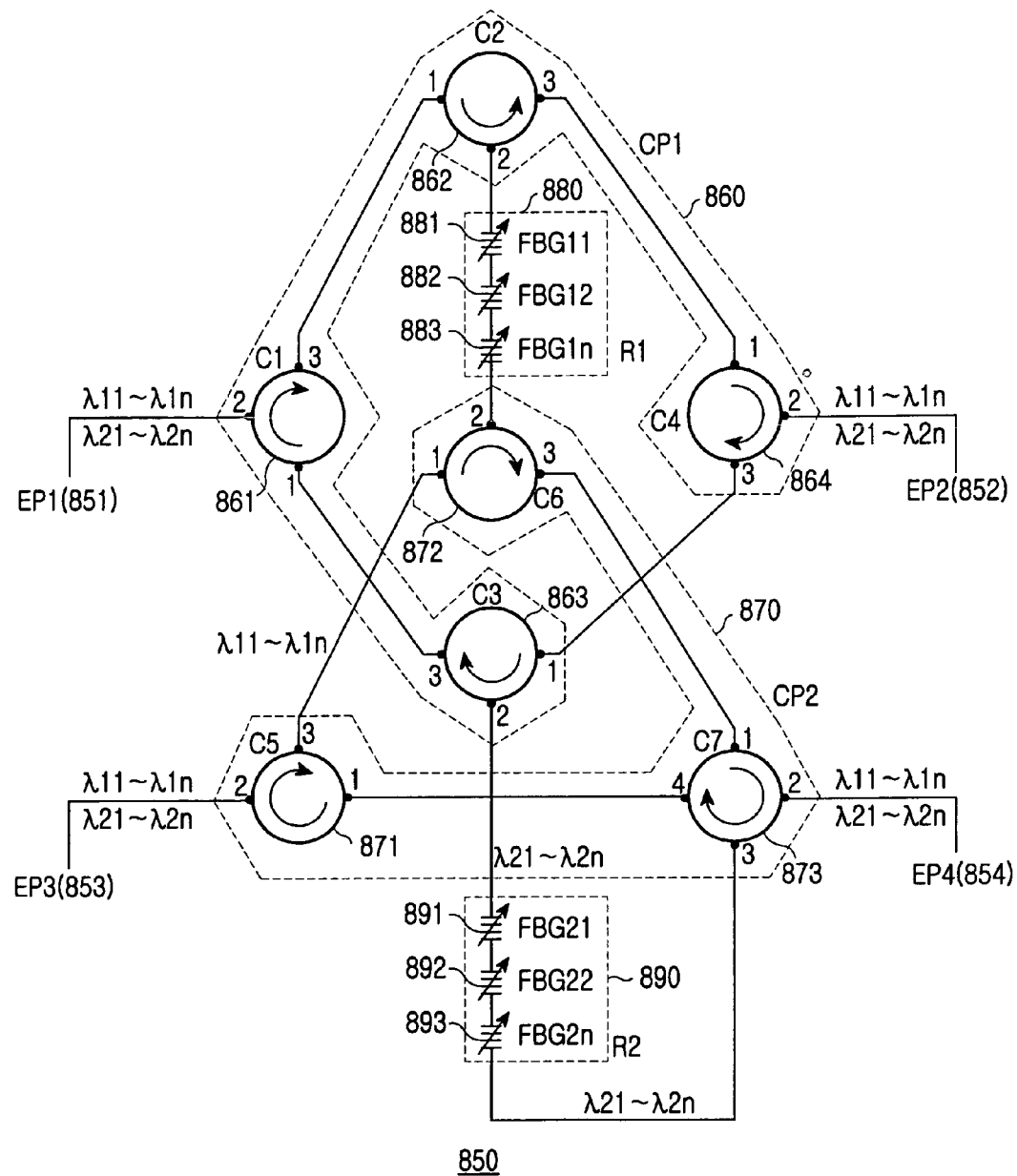
FIG. 16 is a block diagram illustrating the configuration of an OXC device according to a thirteenth embodiment of the present invention.

FIG. 16 is a block diagram illustrating the configuration of an OXC device according to a thirteenth embodiment of the present invention. As shown in FIG. 16, the OXC device designated by the reference numeral 850 includes first and second circulating parts 860 and 870 (CP1 and CP2), and first and second reflecting parts 880 and 890, (R1 and R2).

The first circulating part 860 includes first through fourth circulators 861 to 864 (C1 to C4), each having first through third ports 861-1 to 861-3 in the case of the first circulator 861; 862-1 to 862-3 in the case of the second circulator 862; 863-1 to 863-3 in the case of the third circulator 863; or 864-1 to 864-3 in the case of the fourth circulator 864. The first circulator 861 is connected at its second port 861-2 to a first external port 851 (EP1), whereas the fourth circulator 864 is connected at its second port 864-2 to a second external port 852 (EP2). The first and second external ports 851 and 852 are connected to a first ring network (not shown). The first circulator 861 is connected at its first port 861-1 to the third port 863-3 of the third circulator 863, and at its third port 8613 to the first port 8621 of the second circulator 862. The second circulator 862 is connected at its third port 862-3 to the first port 864-1 of the fourth circulator 864. The third circulator 863 is connected at its first port 863-1 to the third port 864-3 of the fourth circulator 864. Each of the first through fourth circulators 861 to 864 operates to output an optical signal, inputted to a higher-order port thereof, from a lower-order port thereof arranged adjacent to the higher-order port.

The second circulating part 870 includes fifth and sixth circulators 871 and 872 (C5 and C6), each having first through third ports: 871-1 to 871-3 in the case of the fifth circulator 871; or 872-1 to 872-3 in the case of the sixth circulator 872. The second circulating part 870 also includes a seventh circulator 873 (C7), having first through fourth ports 873-1 to 873-4. The fifth circulator 871 is connected at its second port 871-2 to a third external port 853 (EP3), whereas the seventh circulator 873 is connected at its second port 873-2 to a fourth external port 854 (EP4). The third and fourth external ports 853 and 854 are connected to a second ring network (not shown). The fifth circulator 871 is connected at its first port 871-1 to the fourth port 873-4 of the seventh circulator 873, and at its third port 871-1 to the first port 872-1 of the sixth circulator 872. The sixth circulator 872 is connected at its third port 872-3 to the first port 873-1 of the seventh circulator 873. Each of the fifth through seventh circulators 871 to 873 operates to output an optical signal, inputted to a higher-order port thereof, from a lower-order port thereof arranged adjacent to the higher-order port.

The first reflecting part 880 is connected to respective second ports 862-2 and 872-2 of the second and sixth circulators 862 and 872. The second reflecting part 890 is connected to the second port 863-2 of the third circulator 863 and the third port 873-2 of the seventh circulator 873.

Now, operation of the OXC device 850 will be described in conjunction with the first case of outputting, to the fourth external port 854, only the channel λ11 of a forward optical signal inputted to the first external port 851 while outputting the remaining channels of the forward optical signal to the second external port 852, and the second case of outputting, to the third external port 853, only the channel λ22 of a backward optical signal inputted to the second external port 852 while outputting the remaining channels of the backward optical signal to the first external port 851.

The FBG11 881 of the first reflecting part 880 and the FBG22 892 of the second reflecting part 890 are first set in an OFF state by a control unit (not shown), whereas the remaining FBGs of the first and second reflecting parts 880 and 890 are set in an ON state by the control unit. First, the forward optical signal inputted to the first external port 851 is applied to the second port 861-2 of the first circulator 861. In turn, the first circulator 861 outputs the forward optical signal to its third port 861-3 connected to the first port 862-1 of the second circulator 862. The second circulator 862 then outputs the forward optical signal, inputted to its first port 862-1, to its second port 862-2 to which the first reflecting part 880 is connected. The first reflecting part 880 allows only the channel λ11 of the forward optical signal to pass therethrough, while reflecting the remaining channels of the forward optical signal. The forward optical signal reflected from the first reflecting part 880 is re-input to the second port 862-2 of the second circulator 862 which, in turn, outputs the forward optical signal to its third port 862-3 connected to the first port 864-1 of the fourth circulator 864. The fourth circulator 864 then outputs the forward optical signal, inputted to its first port 864-1, to its second port 864-2 connected to the second external port 852. The channel λ11 passing through the first reflecting part 880 is input to the second port 8722 of the sixth circulator 872 which, in turn, outputs the channel λ11 to its third port 872-3 connected to the first port 873-1 of the seventh circulator 873. The seventh circulator 873 then outputs the channel λ11, which is input to its first port 873-1, to its second port 873-2 connected to the fourth external port 854.

Next, the second case will be described. The backward optical signal inputted to the second external port 852 is first applied to the second port 864-2 of the fourth circulator 864. In turn, the fourth circulator 864 outputs the backward optical signal to its third port 864-3 connected to the first port 863-1 of the third circulator 863. The third circulator 863 then outputs the backward optical signal, input to its first port 863-1, to its second port 863-2 to which the second reflecting part 890 is connected. The second reflecting part 890 allows only the channel λ22 of the backward optical signal to pass therethrough while reflecting the remaining channels of the backward optical signal. The backward optical signal reflected from the second reflecting part 890 is re-input to the second port 863-2 of the third circulator 863. In turn, the third circulator 863 outputs the backward optical signal to its third port 863-3 connected to the first port 861-1 of the first circulator 861. The first circulator 861 then outputs the backward optical signal input to its first port 861-1, from its second port 861-2 connected to the first external port 851. The channel λ22 passing through the second reflecting part 890 is input to the third port 873-3 of the seventh circulator 873 which, in turn, outputs the channel λ22 to its fourth port 873-4 connected to the first port 871-1 of the fifth circulator 871. The fifth circulator 871 then outputs the channel λ22 input to its first port 871-1, to its second port 8712 connected to the third external port 853.

Figure 17:
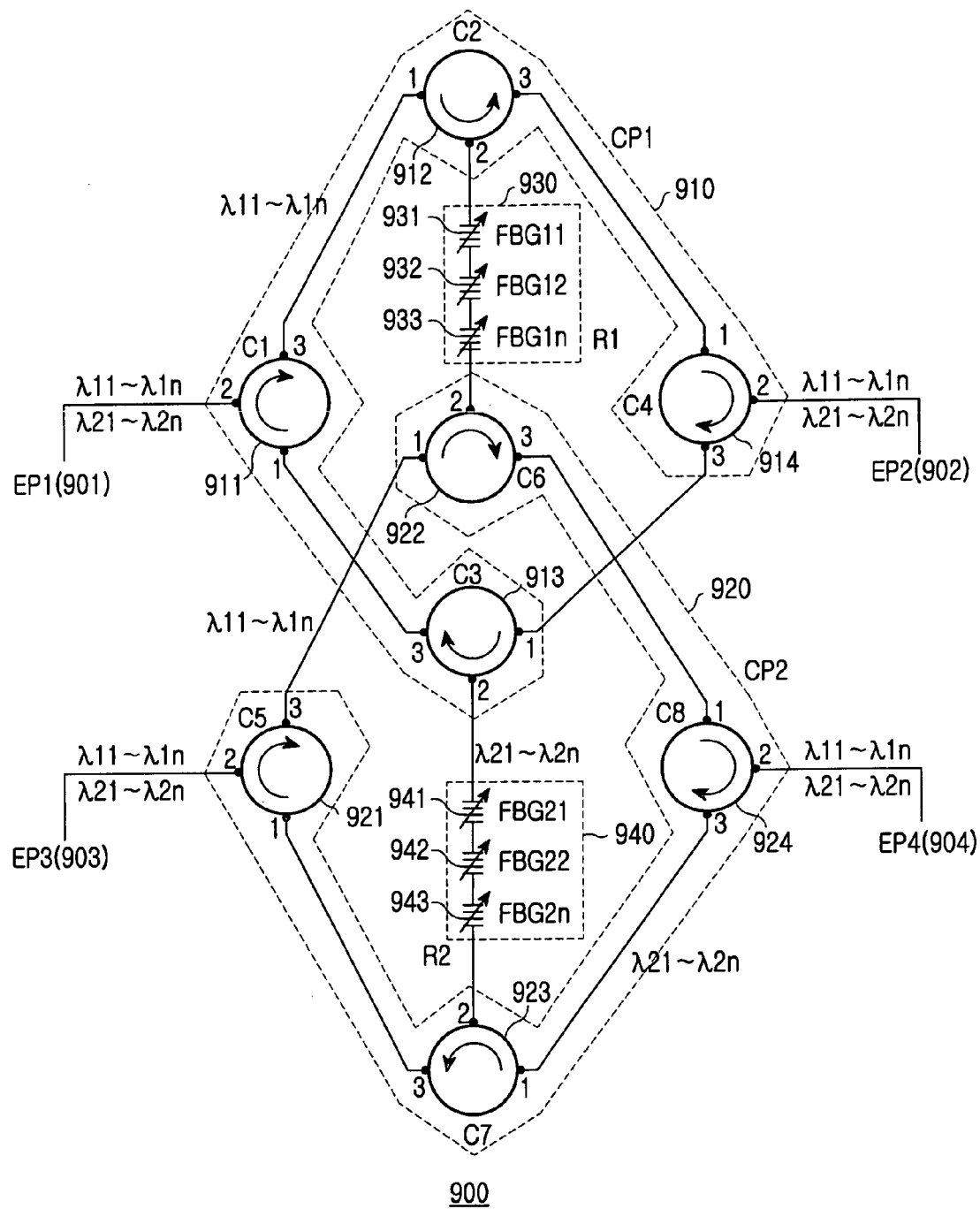
FIG. 17 is a block diagram illustrating the configuration of an OXC device according to a fourteenth embodiment of the present invention.

FIG. 17 is a block diagram illustrating the configuration of an OXC device according to a fourteenth embodiment of the present invention. As shown in FIG. 17, the OXC device designated by the reference numeral 900 includes first and second circulating parts 910 and 920 (CP1 and CP2), and first and second reflecting parts 930 and 940 (R1 and R2).

The first circulating part 910 includes first through fourth circulators 911 to 914 (C1 to C4 (, each having first through third ports 911-1 to 911-3 in the case of the first circulator 911; 912-1 to 912-3 in the case of the second circulator 912; 913-1 to 913-3 in the case of the third circulator 913; or 914-1 to 914-3 in the case of the fourth circulator 914. The first circulator 911 is connected at its second port 911-2 to a first external port 901 (EP1), whereas the fourth circulator 914 is connected at its second port 914-2 to a second external port 902 (EP2). The first and second external ports 901 and 902 are connected to a first ring network (not shown). The first circulator 911 is connected at its first port 911-1 to the third port 913-3 of the third circulator 913, and at its third port 911-3 to the first port 912-1 of the second circulator 912. The second circulator 912 is connected at its third port 912-3 to the first port 914-1 of the fourth circulator 914. The third circulator 913 is connected at its first port 913-1 to the third port 914-3 of the fourth circulator 914. Each of the first through fourth circulators 911 to 914 operates to output an optical signal, inputted to a higher-order port thereof, from a lower-order port thereof arranged adjacent to the higher-order port.

The second circulating part 920 includes fifth through eighth circulators 921 to 924 (C5 to C8), each having first through third ports: 921-1 to 921-3 in the case of the fifth circulator 921; 922-1 to 922-3 in the case of the sixth circulator 922; 923-1 to 923-3 in the case of the seventh circulator 923; or 924-1 to 924-3 in the case of the sixth circulator 924. The fifth circulator 921 is connected at its second port 921-2 to a third external port 903 (EP3), whereas the eighth circulator 924 is connected at its second port 924-2 to a fourth external port 904 (EP4). The third and fourth external ports 903 and 904 are connected to a second ring network (not shown). The fifth circulator 921 is connected at its first port 921-1 to the third port 923-3 of the seventh circulator 923, and at its third port 923-1 to the first port 922-1 of the sixth circulator 922. The sixth circulator 922 is connected at its third port 922-3 to the first port 924-1 of the eighth circulator 924. The seventh circulator 923 is connected at its first port 9231 to the third port 924-3 of the eighth circulator 924. Each of the fifth through eighth circulators 921 to 924 operates to output an optical signal, which is input to a higher-order port thereof, from a lower-order port thereof arranged adjacent to the higher-order port.

The first reflecting part 930 is connected to respective second ports 912-2 and 922-2 of the second and sixth circulators 912 and 922. The second reflecting part 940 is connected to respective second ports 913-2 and 923-2 of the third and seventh circulators 913 and 923.

Now, operation of the OXC device 900 will be described in conjunction with the first case of outputting to the fourth external port 904, only the channel λ11 of a forward optical signal input to the first external port 901. The remaining channels of the forward optical signal are output to the second external port 902. In the second case of outputting to the third external port 903 only the channel λ22 of a backward optical signal is input to the second external port 902 while outputting the remaining channels of the backward optical signal to the first external port 901.

The FBG11 931 of the first reflecting part 930 and the FBG22 942 of the second reflecting part 940 are first set in an OFF state by a control unit (not shown), whereas the remaining FBGs of the first and second reflecting parts 930 and 940 are set in an ON state by the control unit. First, the forward optical signal input to the first external port 901 is applied to the second port 911-2 of the first circulator 911. In turn, the first circulator outputs the forward optical signal to its third port 911-3 connected to the first port 912-1 of the second circulator 912. The second circulator 912 then outputs the forward optical signal, which is input to its first port 912-1, to its second port 912-2 to which the first reflecting part 930 is connected. The first reflecting part 930 allows only the channel λ11 of the forward optical signal to pass therethrough while reflecting the remaining channels of the forward optical signal. The forward optical signal reflected from the first reflecting part 930 is re-input to the second port 912-2 of the second circulator 912 which, in turn, outputs the forward optical signal to its third port 912-3 connected to the first port 914-1 of the fourth circulator 914. The fourth circulator 914 then outputs the forward optical signal, which is input to its first port 914-1, to its second port 914-2 connected to the second external port 902. The channel λ11 passing through the first reflecting part 930 is inputted to the second port 9222 of the sixth circulator 922. In turn, the sixth circulator outputs the channel λ11 to its third port 922-3 connected to the first port 924-1 of the eighth circulator 924. The eighth circulator 924 then outputs the channel λ11, which is input to its first port 9241, to its second port 924-2 connected to the fourth external port 904.

Next, the second case will be described. The backward optical signal inputted to the second external port 902 is first applied to the second port 914-2 of the fourth circulator 914. In turn, the fourth circulator outputs the backward optical signal to its third port 914-3 connected to the first port 913-1 of the third circulator 913. The third circulator 913 then outputs the backward optical signal, input to its first port 913-1, to its second port 913-2 to which the second reflecting part 940 is connected. The second reflecting part 940 allows only the channel λ22 of the backward optical signal to pass therethrough while reflecting the remaining channels of the backward optical signal. The backward optical signal reflected from the second reflecting part 940 is re-input to the second port 913-2 of the third circulator 913 which, in turn, outputs the backward optical signal to its third port 913-3 connected to the first port 911-1 of the first circulator 911. The first circulator 911 then outputs the backward optical signal, inputted to its first port 911-1, to its second port 911-2 connected to the first external port 901. The channel λ22 passing through the second reflecting part 940 is input to the second port 923-2 of the seventh circulator 923 which, in turn, outputs the channel λ22 to its third port 923-3 connected to the first port 921-1 of the fifth circulator 921. The fifth circulator 921 then outputs the channel λ22, input to its first port 921-1, to its second port 921-2 connected to the third external port 903.

As apparent from the above description, the present invention provides a bi-directional OXC device which is configured, using circulators and FBGs, so that it can simplify its switching operation while being inexpensively manufactured.

Also, the bi-directional OXC device has a channel extensibility improved over conventional cases in that it is possible to increase the number of processible channels simply by increasing the number of FBGs each adapted to reflect the channel of an associated wavelength.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An optical cross-connect device for communication between first and second optical networks communicating with each other using forward and backward optical signals each comprising a plurality of channels, said optical cross-connect device comprising:
   a first circulating part having first through fourth ports that are configured to output an optical signal, which is input to a higher-order port thereof, from a lower-order port thereof arranged adjacent to the higher-order port, the first circulating part being connected at the first and third ports thereof to a first optical network;
   a second circulating part having first through fourth ports that are configured to output an optical signal, which is input to a higher-order port thereof, from a lower-order port thereof arranged adjacent to the higher-order port, the second circulating part being connected at the first and third ports thereof to a second optical network while being connected at the second and fourth ports thereof to the second and fourth ports of the first circulating part, respectively;
   a first reflecting part being connected to respective second ports of the first and second circulating parts, being configured to input the forward optical signal, being configured to reflect at least one channel of the forward optical signal, and being configured to allow at least one channel that is not reflected to pass therethrough; and
   a second reflecting part being connected to respective fourth ports of the first and second circulating parts, being configured to input the backward optical signal, being configured to reflect at least one channel of the backward optical signal, and being configured to allow at least one channel that is not reflected to pass therethrough,
   wherein the first circulating part comprises: a first circulator having a plurality of ports including the first and second ports of the first circulating part being configured to output an optical signal, which is input to a higher-order port thereof, from a lower-order port thereof arranged adjacent to the higher-order port; and a second circulator having a plurality of ports including the third and fourth ports of the first circulating part being configured to output an optical signal, which is input to a higher-order port thereof, from a lower-order port thereof arranged adjacent to the higher-order port, and wherein the first and second circulators are connected to each other in a double-port-connected configuration.

2. The optical cross-connect device according to claim 1, wherein each of the first and second reflecting parts comprises a plurality of fiber Bragg gratings (FBG), each of which being adapted to allow an optical signal input thereto to pass through or to reflect only a predetermined channel of the optical signal in accordance with an ON or OFF state thereof.

3. The optical cross-connect device according to claim 1, wherein the second circulating part comprises:
   a third circulator having a plurality of ports including the first and second ports of the second circulating part being configured to output an optical signal, which is input to a higher-order port thereof, from a lower-order port thereof arranged adjacent to the higher-order port; and
   a fourth circulator having a plurality of ports including the third and fourth ports of the second circulating part being configured to output an optical signal, which is input to a higher-order port thereof, from a lower-order port thereof arranged adjacent to the higher-order port;
   wherein the third and fourth circulators are connected to each other in a double-port-connected configuration.

4. The optical cross-connect device according to claim 1, wherein the optical cross-connect device is configured such that the forward optical signals is input to the first reflecting part only once.

5. The optical cross-connect device according to claim 1, wherein the optical cross-connect device is configured such that the backward optical signal are input to the second reflecting part only once.

6. The optical cross-connect device according to claim 1, wherein the optical cross-connect device is configured to input forward and backward optical signals.

7. An optical cross-connect device for communication between first and second optical networks communicating with each other using forward and backward optical signals each comprising a plurality of channels, said optical cross-connect device comprising:
   a first circulating part having first through fourth ports that are configured to output an optical signal, which is input to a higher-order port thereof, from a lower-order port thereof arranged adjacent to the higher-order port, the first circulating part being connected at the first and third ports thereof to a first optical network;
   a second circulating part having first through fourth ports that are configured to output an optical signal, which is input to a higher-order port thereof, from a lower-order port thereof arranged adjacent to the higher-order port, the second circulating part being connected at the first and third ports thereof to a second optical network while being connected at the second and fourth ports thereof to the second and fourth ports of the first circulating part, respectively;
   a first reflecting part being connected to respective second ports of the first and second circulating parts, being configured to input the forward optical signal, being configured to reflect at least one channel of the forward optical signal, and being configured to allow at least one channel that is not reflected to pass therethrough; and
   a second reflecting part being connected to respective fourth ports of the first and second circulating parts, being configured to input the backward optical signal, being configured to reflect at least one channel of the backward optical signal, and being configured to allow at least one channel that is not reflected to pass therethrough,
   wherein the first circulating part comprises: a first circulator having a plurality of ports including the first port of the first circulating part being configured to output an optical signal, which is input to a higher-order port thereof, from a lower-order port thereof arranged adjacent to the higher-order port; a second circulator having a plurality of ports including the second port of the first circulating part being configured to output an optical signal, which is input to a higher-order port thereof, from a lower-order port thereof arranged adjacent to the higher-order port; and a third circulator having a plurality of ports including the third and fourth ports of the first circulating part being configured to output an optical signal, which is input to a higher-order port thereof, from a lower-order port thereof arranged adjacent to the higher-order port, and wherein the first through third circulators are port-connected to one another.

8. The optical cross-connect device according to claim 7, wherein the second circulating part comprises:
  a fourth circulator having a plurality of ports including the first port of the second circulating part being configured to output an optical signal, which is input to a higher-order port thereof, from a lower-order port thereof arranged adjacent to the higher-order port;
  a fifth circulator having a plurality of ports including the second port of the second circulating part being configured to output an optical signal, which is input to a higher-order port thereof, from a lower-order port thereof arranged adjacent to the higher-order port; and
  a sixth circulator having a plurality of ports including the third and fourth ports of the second circulating part being configured to output an optical signal, which is input to a higher-order port thereof, from a lower-order port thereof arranged adjacent to the higher-order port,
  wherein the fourth through sixth circulators are port-connected to one another.

9. An optical cross-connect device for communication between first and second optical networks communicating with each other using forward and backward optical signals each comprising a plurality of channels, said optical cross-connect device comprising:
  a first circulating part having first through fourth ports that are configured to output an optical signal, which is input to a higher-order port thereof, from a lower-order port thereof arranged adjacent to the higher-order port, the first circulating part being connected at the first and third ports thereof to a first optical network;
  a second circulating part having first through fourth ports that are configured to output an optical signal, which is input to a higher-order port thereof; from a lower-order port thereof arranged adjacent to the higher-order port, the second circulating part being connected at the first and third ports thereof to a second optical network while being connected at the second and fourth ports thereof to the second and fourth ports of the first circulating part, respectively;
  a first reflecting part being connected to respective second ports of the first and second circulating parts, being configured to input the forward optical signal, being configured to reflect at least one channel of the forward optical signal, and being configured to allow at least one channel that is not reflected to pass therethrough; and
  a second reflecting part being connected to respective fourth ports of the first and second circulating parts, being configured to input the backward optical signal, being configured to reflect at least one channel of the backward optical signal, and being configured to allow at least one channel that is not reflected to pass therethrough,
  wherein the first circulating part comprises: a first circulator having a plurality of ports including the first port of the first circulating part while configured to output an optical signal, which is input to a higher-order port thereof, from a lower-order port thereof arranged adjacent to the higher-order port; a second circulator having a plurality of ports including the third port of the first circulating part being configured to output an optical signal, which is input to a higher-order port thereof, from a lower-order port thereof arranged adjacent to the higher-order port; and a third circulator having a plurality of ports including the second and fourth ports of the first circulating part being configured to output an optical signal, which is input to a higher-order port thereof, from a lower-order port thereof arranged adjacent to the higher-order port, and wherein the first through third circulators are port-connected to one another.

10. The optical cross-connect device according to claim 9, wherein the second circulating part comprises:
  a fourth circulator having a plurality of ports including the first port of the second circulating part being configured to output an optical signal, which is input to a higher-order port thereof, from a lower-order port thereof arranged adjacent to the higher-order port;
  a fifth circulator having a plurality of ports including the third port or the second circulating part being configured to output an optical signal, which is input to a higher-order port thereof, from a lower-order port thereof arranged adjacent to the higher-order port; and
  a sixth circulator having a plurality of ports including the second and fourth ports of the second circulating part being configured to output an optical signal, which is input to a higher-order port thereof, from a lower-order port thereof arranged adjacent to the higher-order port,
  wherein the fourth through sixth circulators are port-connected to one another.

11. An optical cross-connect device for communication between first and second optical networks communication with each other using forward and backward optical signals each comprising a plurality of channels, said optical cross-connect device comprising:
  a first circulating part having first through fourth ports that are configured to output an optical signal, which is input to a higher-order port thereof, from a lower-order port thereof arranged adjacent to the higher-order port, the first circulating part being connected at the first and third ports thereof to a first optical network;
  a second circulating part having first through fourth ports that are configured to output an optical signal, which is input to a higher-order port thereof, from a lower-order port thereof arranged adjacent to the higher-order port, the second circulating part being connected at the first and third ports thereof to a second optical network while being connected at the second and fourth ports thereof to the second and fourth ports of the first circulating part, respectively;
  a first reflecting part being connected to respective second ports of the first and second circulating parts, being configured to input the forward optical signal, being configured to reflect at least one channel of the forward optical signal, and being configured to allow at least one channel that is not reflected to pass therethrough; and a second reflecting part being connected to respective fourth ports of the first and second circulating parts, being configured to input the backward optical signal, being configured to reflect at least one channel of the backward optical signal, and being configured to allow at least one channel that is not reflected to pass therethrough, wherein the first circulating part comprises: a first circulator having a plurality of ports including the first port of the first circulating part being configured to output an optical signal, which is input to a higher-order port thereof, from a lower-order port thereof arranged adjacent to the higher-order port; a second circulator having a plurality of ports including the second port of the first circulating part being configured to output an optical signal, which is input to a higher-order port thereof, from a lower-order port thereof arranged adjacent to the higher-order port; a third circulator having a plurality of ports including the third port of the first circulating part being configured to output an optical signal, which is input to a higher-order port thereof, from lower-order port thereof arranged adjacent to the higher-order port; and a fourth circulator having a plurality of ports including the fourth port of the first circulating part being configured to output an optical signal, which is input to a higher-order port thereof, from a lower-order port thereof arranged adjacent to the higher-order port, and wherein the first through fourth circulators are port-connected to one another.

12. The optical cross-connect device according to claim 11, wherein the second circulating part comprises:

a fifth circulator having a plurality of ports including the first port of the second circulating part being configured to output an optical signal, which is input to a higher-order port thereof, from a lower-order port thereof arranged adjacent to the higher-order port;

a sixth circulator having a plurality of ports including the second port of the second circulating part being configured to output an optical signal, which is input to a higher-order port thereof, from a lower-order port thereof arranged adjacent to the higher-order port;

a seventh circulator having a plurality of ports including the third port of the second circulating part being configured to output an optical signal, which is input to a higher-order port thereof, from a lower-order port thereof arranged adjacent to the higher-order port; and a eighth circulator having a plurality of ports including the fourth port of the second circulating part being configured to output an optical signal, which is input to a higher-order port thereof, from a lower-order port thereof arranged adjacent to the higher-order port, wherein the fifth through eighth circulators are port-connected to one another.

* * * * *